US010384661B2

(12) United States Patent
Ishida

(10) Patent No.: US 10,384,661 B2
(45) Date of Patent: Aug. 20, 2019

(54) VEHICLE BRAKING CONTROL DEVICE

(71) Applicant: ADVICS CO., LTD., Kariya-shi, Aichi-ken (JP)

(72) Inventor: Yasuhito Ishida, Toyokawa (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 8 days.

(21) Appl. No.: 15/553,948

(22) PCT Filed: Feb. 26, 2016

(86) PCT No.: PCT/JP2016/055755
§ 371 (c)(1),
(2) Date: Aug. 25, 2017

(87) PCT Pub. No.: WO2016/136929
PCT Pub. Date: Sep. 1, 2016

(65) Prior Publication Data
US 2018/0072291 A1    Mar. 15, 2018

(30) Foreign Application Priority Data

Feb. 27, 2015  (JP) ................................. 2015-037803

(51) Int. Cl.
*B60T 13/18* (2006.01)
*B60T 8/48* (2006.01)
(Continued)

(52) U.S. Cl.
CPC ............ *B60T 8/4872* (2013.01); *B60T 7/042* (2013.01); *B60T 8/175* (2013.01); *B60T 8/245* (2013.01);
(Continued)

(58) Field of Classification Search
CPC ........ B60T 8/175; B60T 8/245; B60T 8/4872; B60T 13/145; B60T 13/686
(Continued)

(56) References Cited

U.S. PATENT DOCUMENTS 5,884,986 A * 3/1999 Shimizu ................ B60T 8/4036
303/10
8,328,690 B2 * 12/2012 Ohtsu ................. B60T 8/17616
477/185
(Continued)

FOREIGN PATENT DOCUMENTS

JP    08-310374 A    11/1996
JP    2003-220940 A    8/2003
(Continued)

OTHER PUBLICATIONS

International Search Report (PCT/ISA/210) dated Apr. 26, 2016, by the Japanese Patent Office as the International Searching Authority for International Application No. PCT/JP2016/055755.
(Continued)

*Primary Examiner* — Christopher P Schwartz
(74) *Attorney, Agent, or Firm* — Buchanan Ingersoll & Rooney PC

(57) ABSTRACT

A brake ECU of a vehicle braking control device, during execution of brake pressurization control, performs actuation restriction control that restricts actuation of a motor as an arbitrary upstream fluid pressure (M/C pressure) that is the brake pressure input from the M/C side of the brake fluid pressure control actuator becomes higher. The brake ECU has a threshold value changing unit that sets at least the starting threshold value at a high level when the upstream fluid pressure (M/C pressure) is high compared to when low, and as actuation restriction control actuates the motor to pump out the brake fluid from inside of the reservoirs when the reservoir fluid volume exceeds the starting threshold
(Continued)

value, and stops the motor when the reservoir fluid volume equals the stop threshold value.

17 Claims, 11 Drawing Sheets

(51) Int. Cl.
*B60T 7/04* (2006.01)
*B60T 13/14* (2006.01)
*B60T 13/66* (2006.01)
*B60T 13/68* (2006.01)
*B60T 8/175* (2006.01)
*B60T 8/24* (2006.01)

(52) U.S. Cl.
CPC .......... *B60T 13/145* (2013.01); *B60T 13/146* (2013.01); *B60T 13/662* (2013.01); *B60T 13/686* (2013.01); *B60T 2201/04* (2013.01); *B60T 2210/16* (2013.01)

(58) Field of Classification Search
USPC .............. 303/3, 10, 11, 15, 20, 113.1–113.5, 303/114.1, 115.1–115.2, 116.1–116.4, 155
See application file for complete search history.

(56) References Cited

U.S. PATENT DOCUMENTS

| | | | |
|---|---|---|---|
| 8,352,142 B2 * | 1/2013 | Nishida | B60T 7/22 303/10 |
| 2002/0096936 A1 * | 7/2002 | Ishida | B60T 8/24 303/114.1 |
| 2002/0121807 A1 * | 9/2002 | Sakata | B60T 7/22 303/155 |
| 2004/0215385 A1 * | 10/2004 | Aizawa | B60K 31/00 701/93 |
| 2010/0117445 A1 * | 5/2010 | Kato | B60T 7/042 303/11 |
| 2014/0257658 A1 | 9/2014 | Shimizu | |

FOREIGN PATENT DOCUMENTS

| | | |
|---|---|---|
| JP | 2004-090679 A | 3/2004 |
| JP | 2014-169039 A | 9/2014 |

OTHER PUBLICATIONS

Written Opinion (PCT/ISA/237) dated Apr. 26, 2016, by the Japanese Patent Office as the International Searching Authority for International Application No. PCT/JP2016/055755.

* cited by examiner

[FIG. 1]
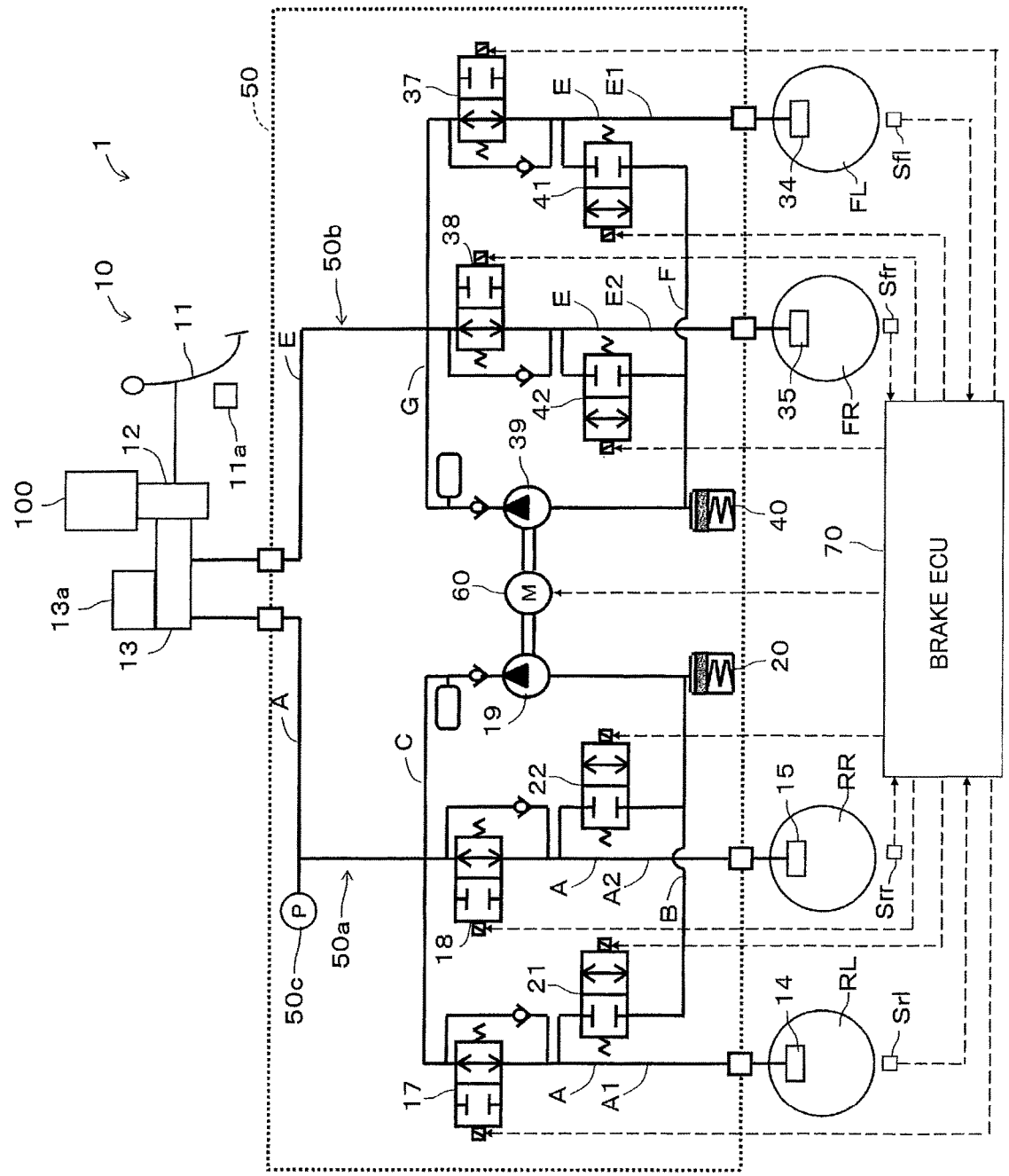

[FIG. 2A]

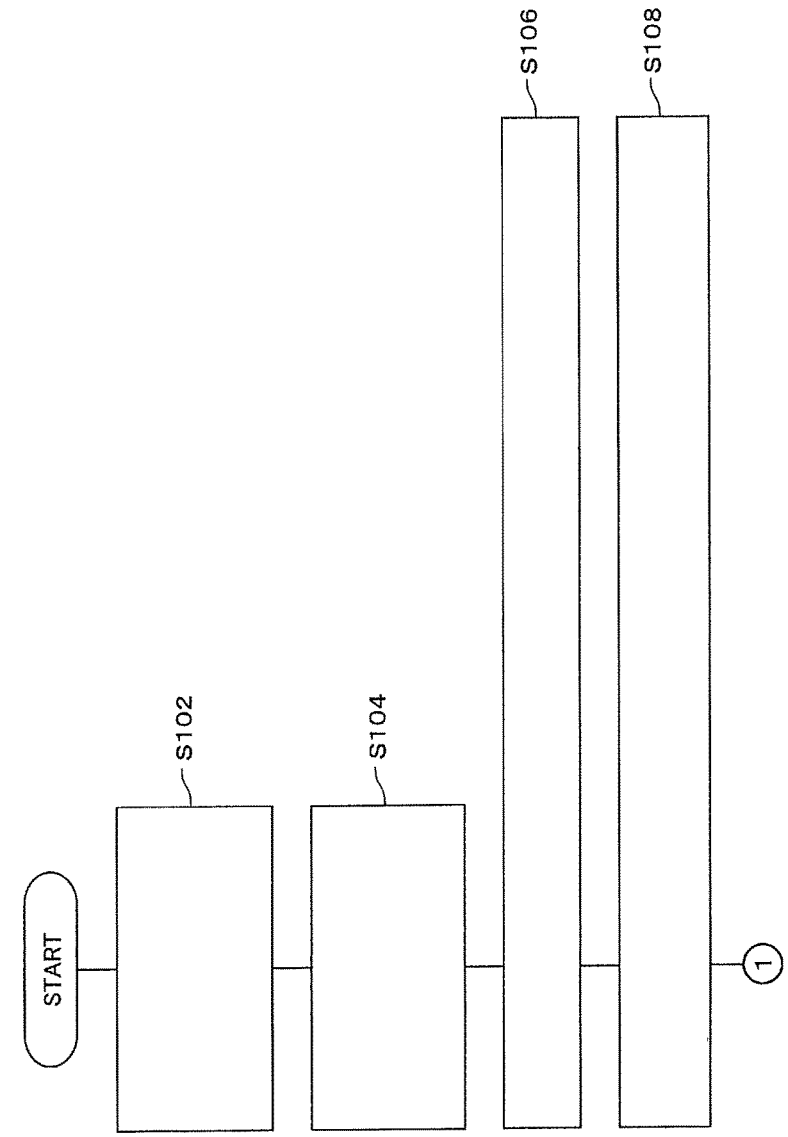

S102 EACH-WHEEL FLUID PRESSURE ACUISITION
·CurrentPressFL
·CurrentPressFR
·CurrentPressRL
·CurrentPressRR
S104 EACH-WHEEL TARGET FLUID PRESSURE ACUISITION
·TargetPressFL
·TargetPressFR
·TargetPressRL
·TargetPressRR
S106 UPSTREAM TARGET PRESSURE CALCULATION
·TargetMaxPress(n)=MAX(TargetPressFL, TargetPressFR, TargetPressRL, TargetPressRR)
S108 UPSTREAM TARGET PRESSURE VARIABLE AMOUNT CALCULATION
·ΔTargetMaxPress(n)=(TargetMaxPress(n) - TargetMaxPress(n-1)) / T
·ΔTargetMaxPressF(n)=ΔTargetMaxPress(n) Filtering process

[FIG. 2B]

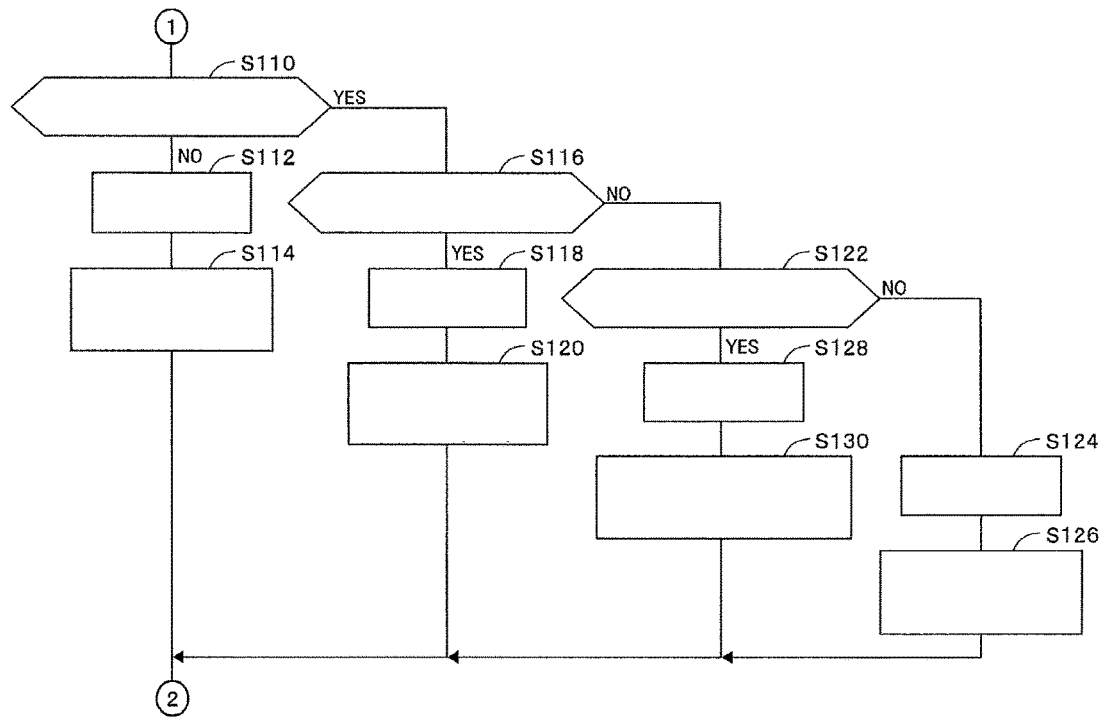

S110 PRESSURE DEVIATION(TargetMaxPress(n)-TargetPress**) > DiffPress?
S112 DOWNSTREAM CONTROL
 ·PRESSURE-INCREASING MODE
S114 RESERVOIR ESTIMATION
 ·EstReserv*(n)=EstReserv*(n - 1)
S116 EACH WHEEL DEVIATION(TargetPress-CurrentPress)> DiffPress?
S118 DOWNSTREAM CONTROL
 ·PRESSURE-INCREASING CONTROL
S120 RESERVOIR ESTIMATION
 ·EstReserv*(n)=EstReserv*(n - 1)
S122 EACH WHEEL DEVIATION(TargetPress-CurrentPress)> -DiffPress?
S124 DOWNSTREAM CONTROL
 ·HOLDING CONTROL
S126 RESERVOIR ESTIMATION
 ·EstReserv*(n)=EstReserv*(n - 1)
S128 DOWNSTREAM CONTROL
 ·PRESSURE-REDUCING CONTROL
S130 RESERVOIR ESTIMATION
 ·EstReserv*(n)=EstReserv*(n - 1)+PRESSURE-REDUCING AMOUNT

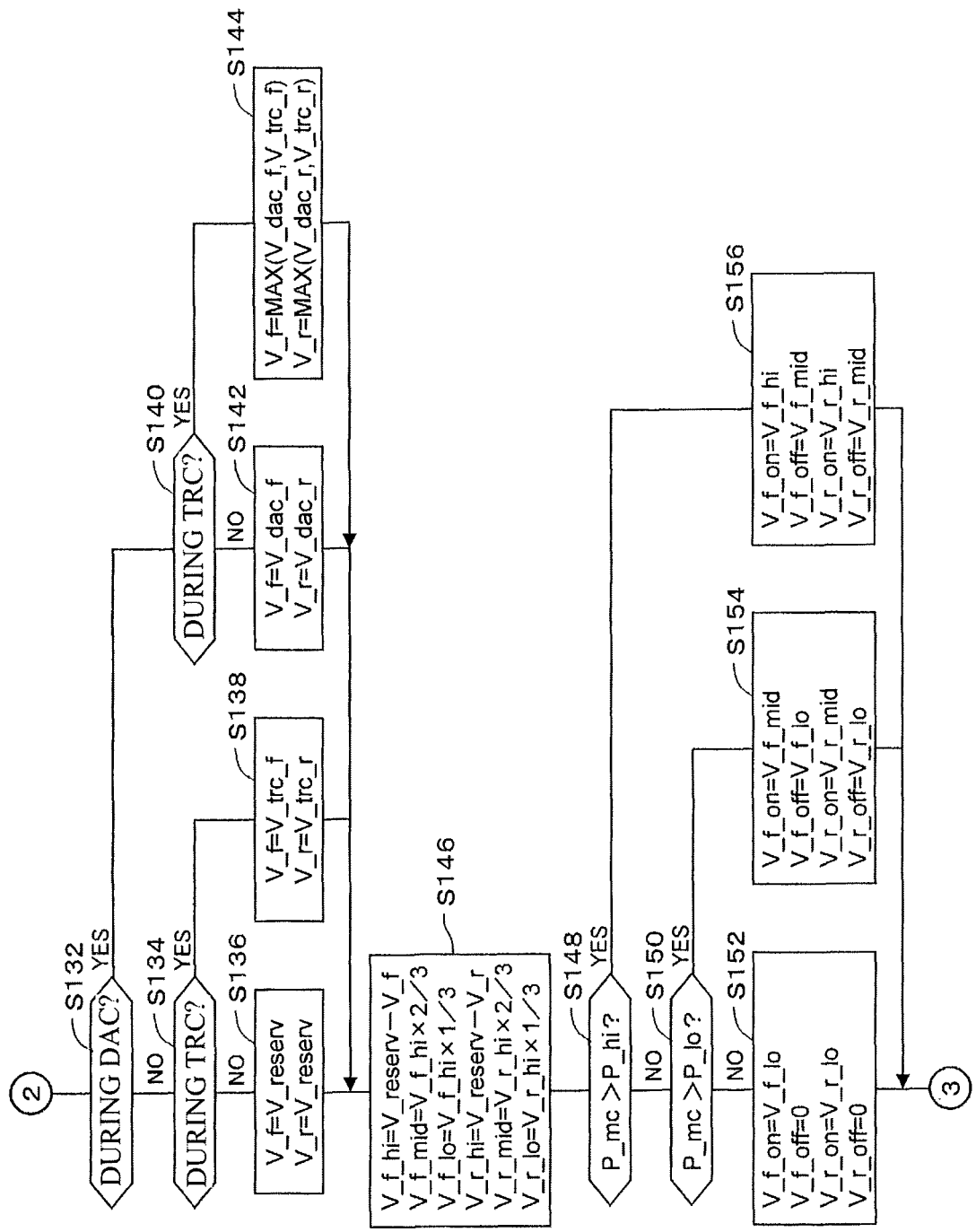
[FIG. 2C]

[FIG. 2D]
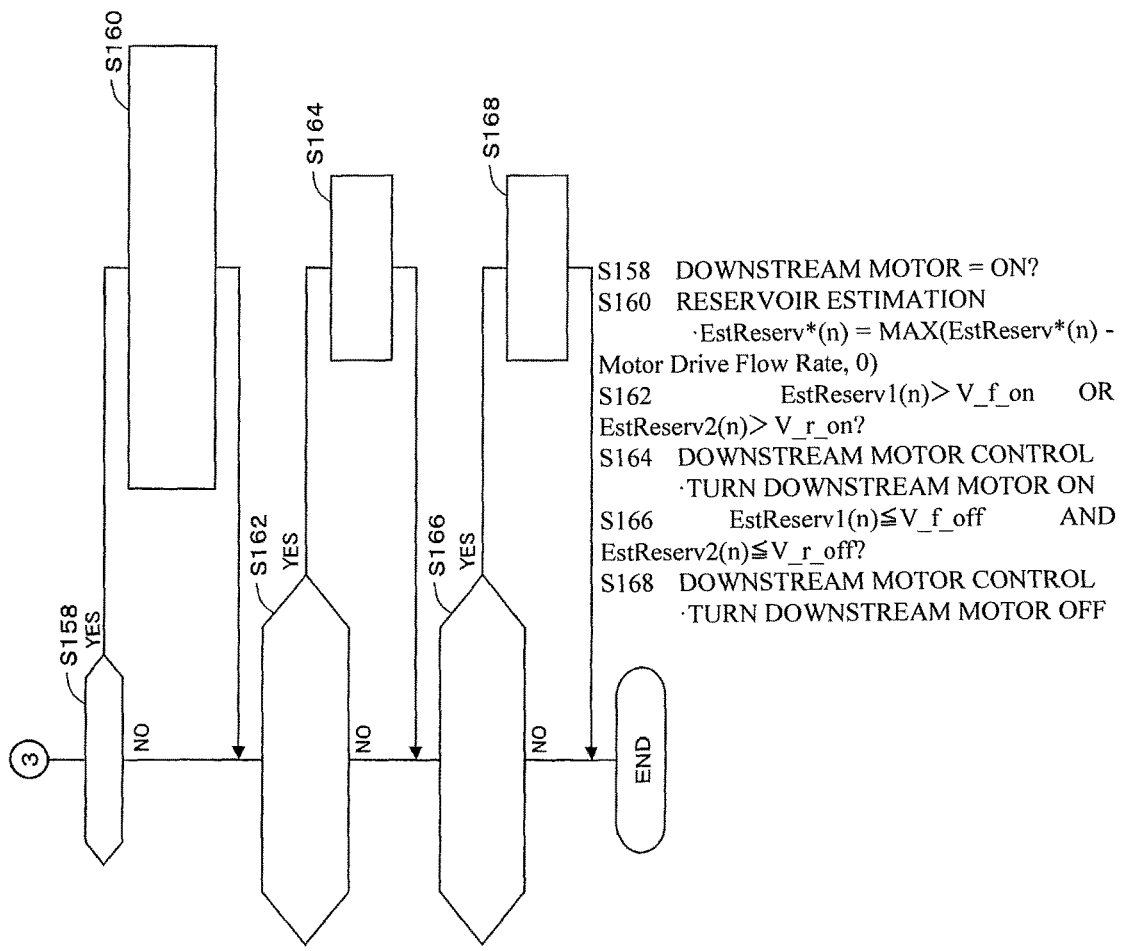
S158  DOWNSTREAM MOTOR = ON?
S160  RESERVOIR ESTIMATION
      ·EstReserv*(n) = MAX(EstReserv*(n) − Motor Drive Flow Rate, 0)
S162        EstReserv1(n) > V_f_on    OR  EstReserv2(n) > V_r_on?
S164  DOWNSTREAM MOTOR CONTROL
      ·TURN DOWNSTREAM MOTOR ON
S166        EstReserv1(n) ≦ V_f_off    AND  EstReserv2(n) ≦ V_r_off?
S168  DOWNSTREAM MOTOR CONTROL
      ·TURN DOWNSTREAM MOTOR OFF
[FIG. 3]
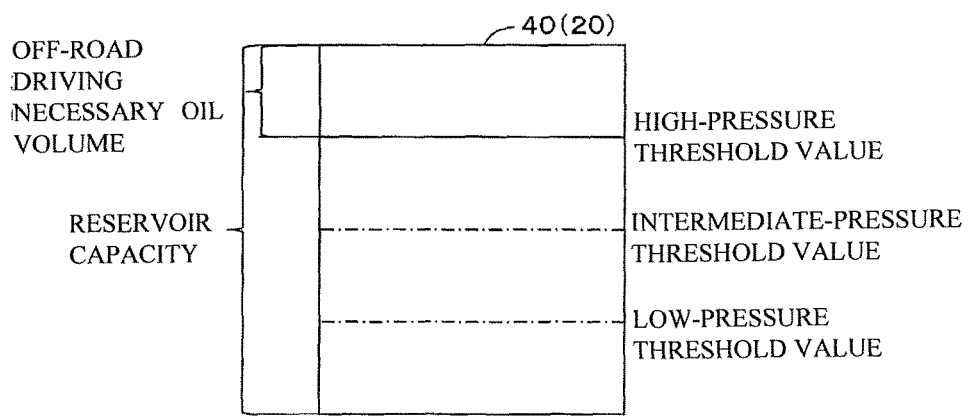

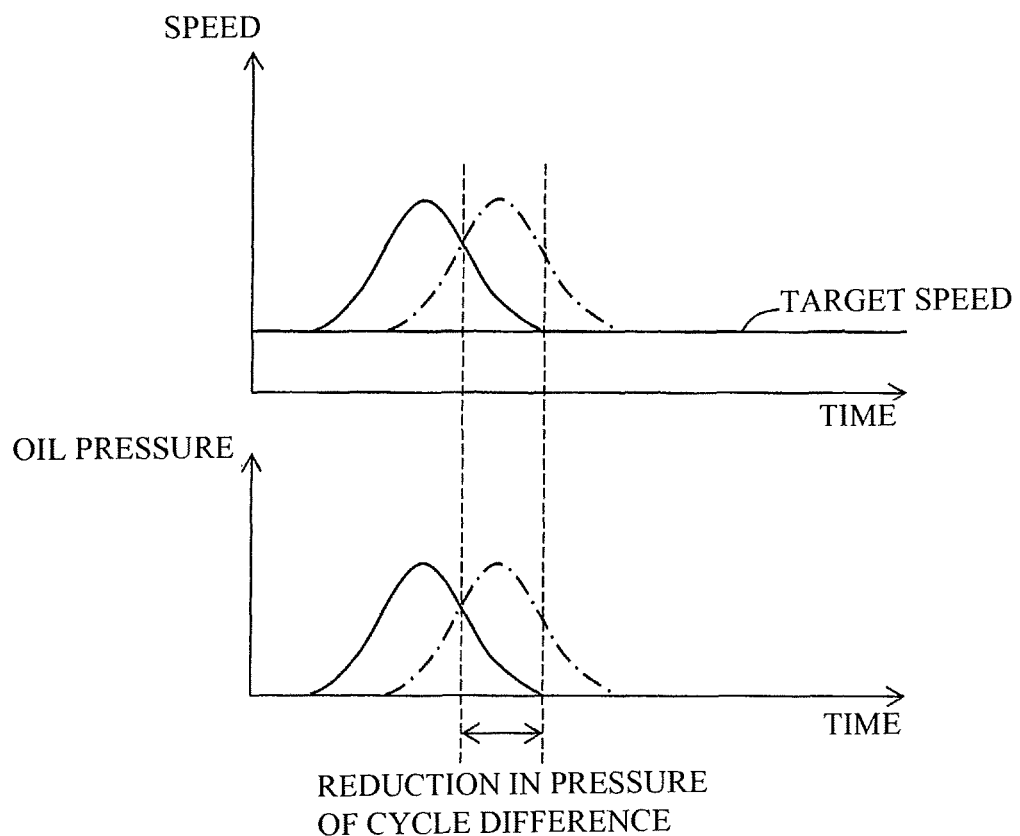

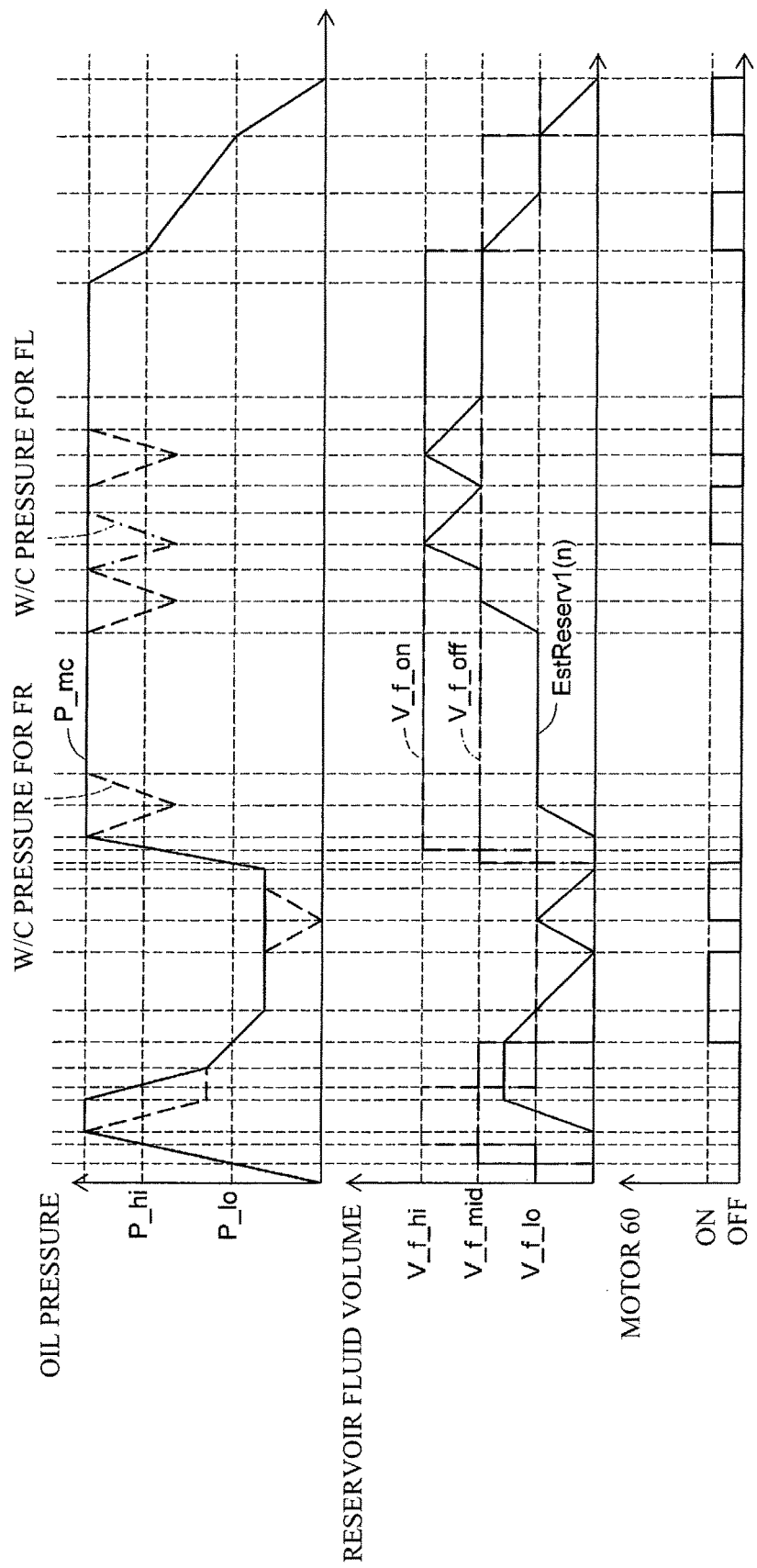
[FIG. 5]

[FIG. 6]
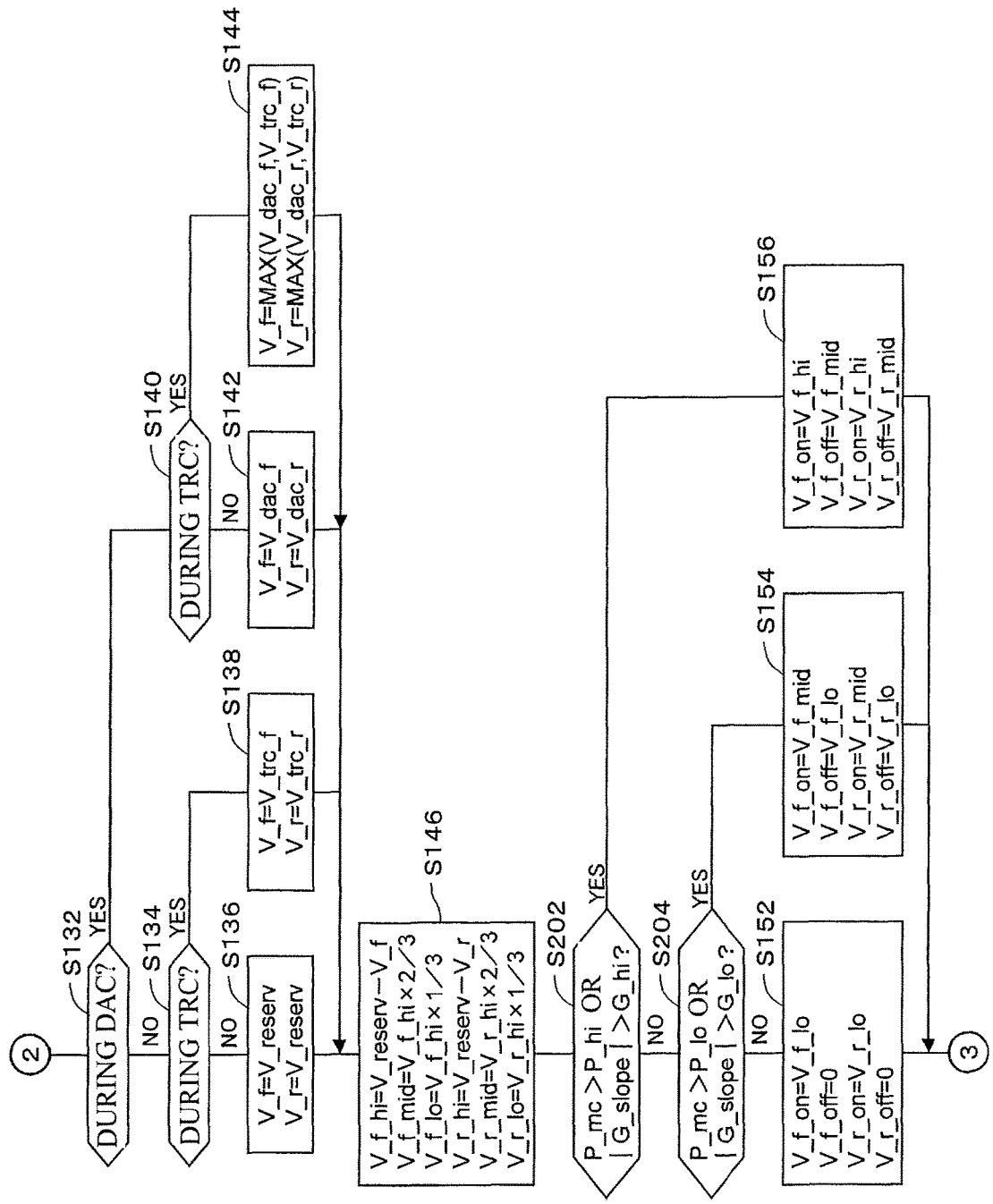

[FIG. 7]

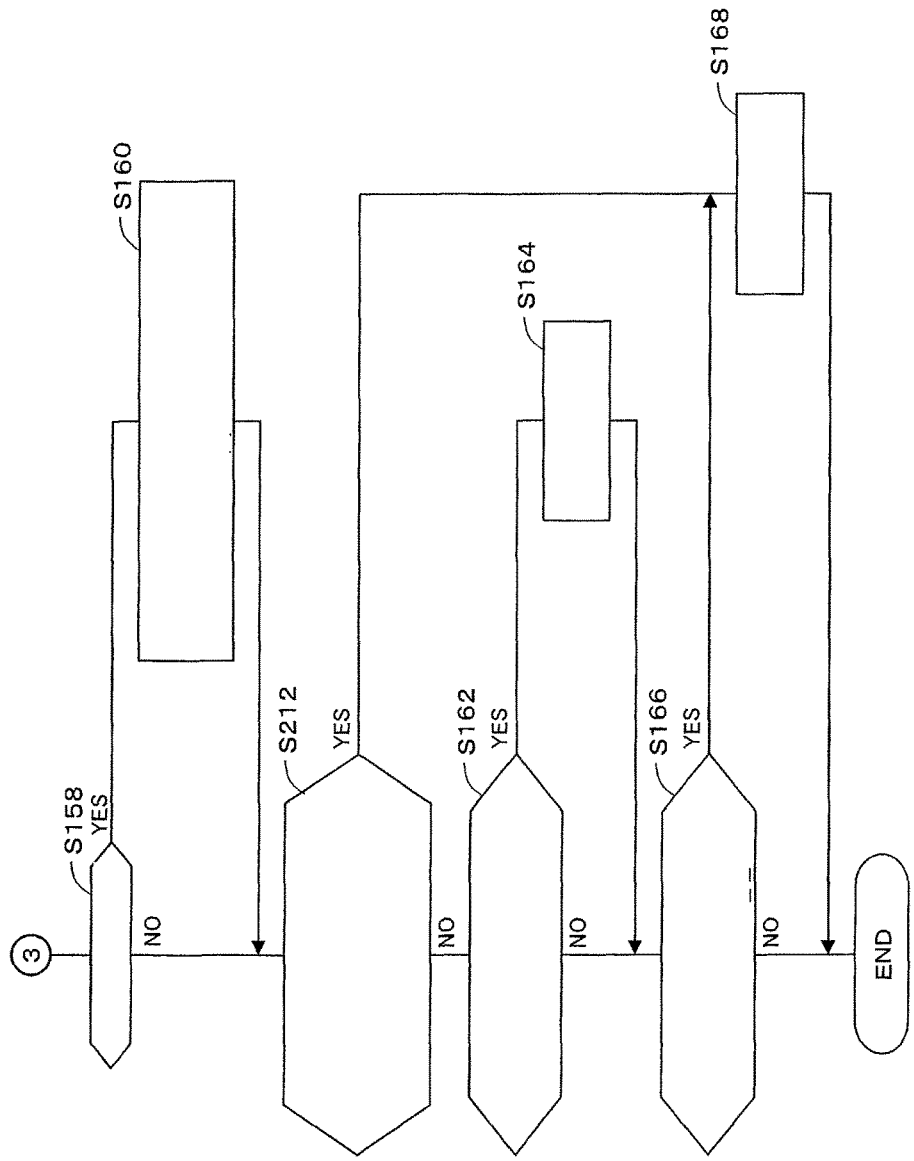

S158   DOWNSTREAM MOTOR = ON?
S160   RESERVOIR ESTIMATION
       ·EstReserv*(n) = MAX(EstReserv*(n) - Motor Drive Flow Rate, 0)
S212   ·DURING TRC CONTROL
       ·OUT OF DAC CONTROL
       ·ALL FOUR WHEELS DiffVw** ≦ 0
       ·TargetMaxPress ≦ 0
       ARE THE ABOVE ALL CONDITIONS ESTABLISHED FOR PREDETERMINED TIME?
S162   EstReserv1(n) > V_f_on OR EstReserv2(n) > V_r_on?
S164   DOWNSTREAM MOTOR CONTROL
       ·TURN DOWNSTREAM MOTOR ON
S166   EstReserv1(n) ≦ V_f_off AND EstReserv2(n) ≦ V_r_off?
S168   DOWNSTREAM MOTOR CONTROL
       ·TURN DOWNSTREAM MOTOR OFF

[FIG. 8]
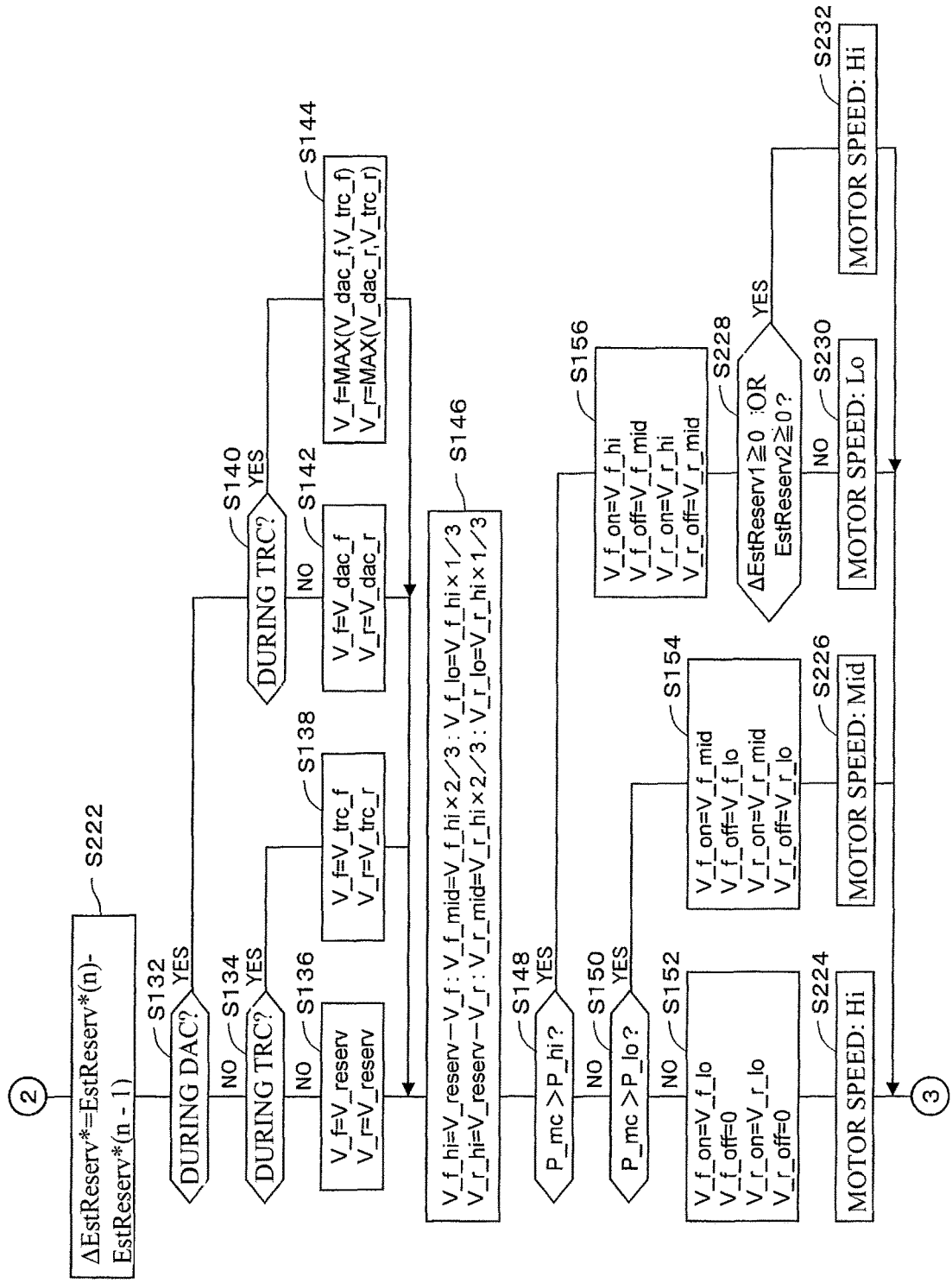

[FIG. 9]
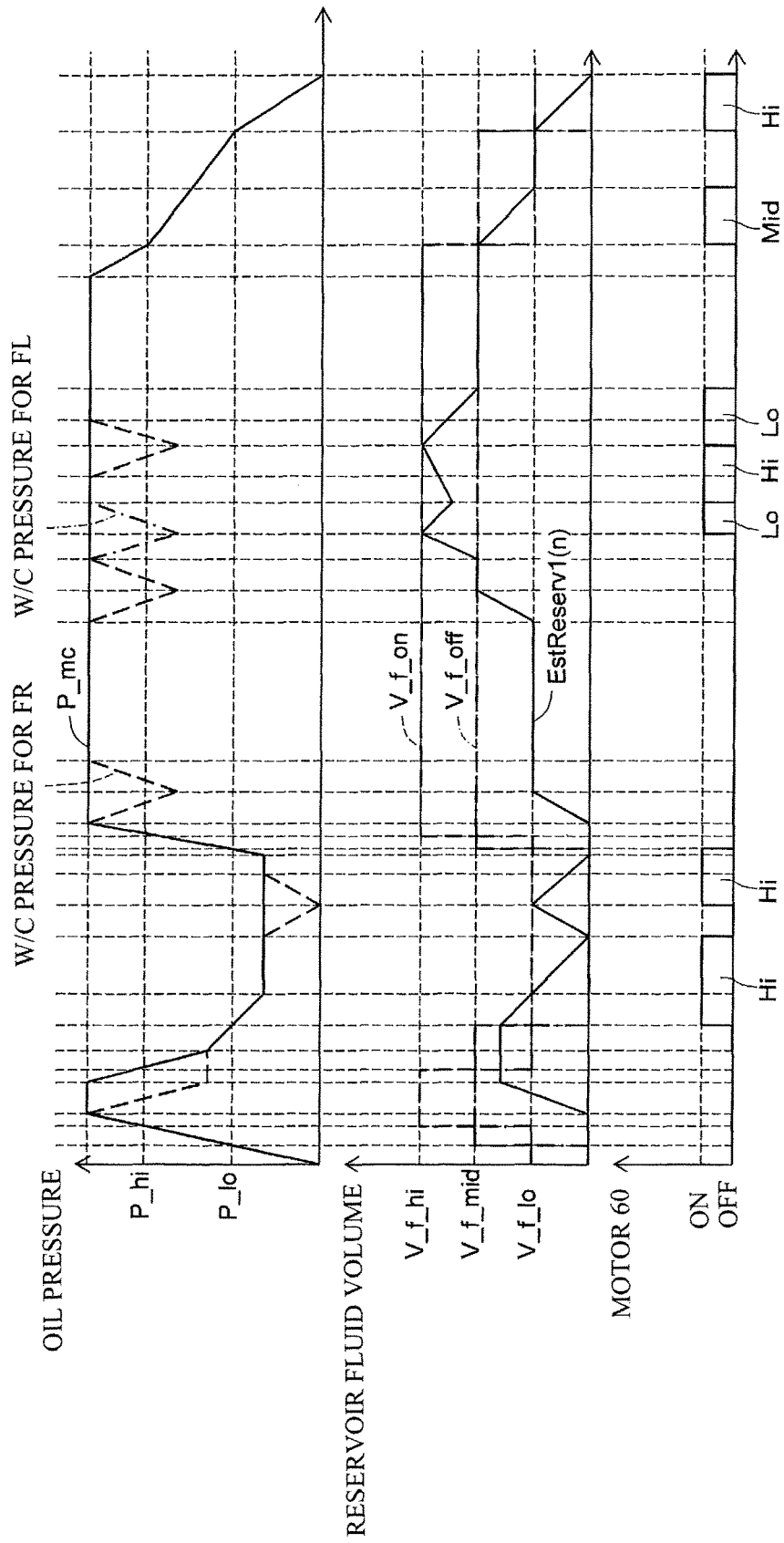

VEHICLE BRAKING CONTROL DEVICE

TECHNICAL FIELD

The present invention relates to a vehicle braking control device.

BACKGROUND ART

As one type of vehicle braking control devices, a vehicle braking control device described in Patent Literature 1 is known. As shown in FIG. 1 in Patent Literature 1, the vehicle braking control device (brake control device 1) includes a master cylinder 2, a fluid pressure control device 3, wheel cylinders 4a to 4D disposed for wheels FL, FR, RL, and RR, respectively, and an electric booster 5 disposed to be connected to the master cylinder 2. In this manner, a system in which a durable M/C pressure source (electric booster 5) also used in a normal brake and a fluid pressure control unit (fluid pressure control device 3) used in an anti-lock brake control (to be referred to as ABS (Antilock Brake System) or traction control (to be referred to as TRC (Traction Control System) control hereinafter) are combined to each other to perform brake pressurization control is proposed.

In the vehicle braking control device according to Patent Literature 1, in place of the fluid pressure control device 3, a brake unit BU shown in FIG. 1 in Patent Literature 2 may be used.

Patent Literature 3 proposes a technique in which a fluid pressure control unit executes brake pressurization control which requires a long continuous operation time, for example, constant-speed traveling control in off-road driving.

CITATION LIST

Patent Literatures

Patent Literature 1: Unexamined Japanese Patent Publication No. 2014-169039

Patent Literature 2: Unexamined Japanese Patent Publication No. 2003-220940

Patent Literature 3: Unexamined Japanese Patent Publication No. 2004-090679

As described above, in the vehicle braking control device according to Patent Literature 1, when, in place of the fluid pressure control device 3, the brake unit BU shown in FIG. 1 in Patent Literature 2 is used, a time for driving a pump becomes long when the brake pressurization control requiring a long continuous operation time is performed. More specifically, since an energization time for a motor driving the pump becomes long to flow a large current to the motor, the motor disadvantageously generates heat to limit the operation time of the motor consequently.

Furthermore, when an oil pressure of a discharge destination of the pump, i.e., a master cylinder pressure serving as an upstream fluid pressure input from a master cylinder side to the brake unit BU is high, a load on the pump becomes high, and, consequently, a load on the motor becomes high so as to disadvantageously cause the motor to generate heat more easily.

SUMMARY OF INVENTION

The present invention has been made to solve the above problems and has as its object to make it possible to execute brake pressurization control for a longer time while heat generation of a motor related to the brake pressurization control is further suppressed in a vehicle braking control device.

In order to solve the above problems, an invention of a vehicle braking control device includes: a master cylinder which generates a master cylinder pressure based on an operation of a brake operation member; wheel cylinders which are coupled to the master cylinder, disposed in response to wheels, and generate wheel cylinder pressures to generate braking force to the wheels; a fluid pressure adjusting unit which is disposed between the master cylinder and the wheel cylinders and adjusts the wheel cylinder pressures; an auxiliary pressure source which acts on the master cylinder or takes in a pressure from a pressure source to make it possible to generate an arbitrary upstream fluid pressure serving as a brake pressure input from the master cylinder side of the pressure adjusting unit regardless of the operation of the brake operation member; and a control unit which uses the auxiliary pressure source and the fluid pressure adjusting unit to generate the upstream fluid pressure higher than a pressure based on an operation of the brake operation member by the auxiliary pressure source and executes brake pressurization control causing the fluid pressure adjusting unit to generate arbitrary braking force for the wheels, wherein the fluid pressure adjusting unit includes a pressure-increasing control valve which is disposed in a main pipe line connecting the master cylinder and the wheel cylinder to each other and controls communication/blocking of the main pipe line, a reservoir which discharges a brake fluid from the main pipe line through a pressure-reducing pipe line connected between the pressure-increasing control valve and the wheel cylinders in the main pipe line, a pressure-reducing control valve controlling communication/blocking of the pressure-reducing pipe line, a pump returning the brake fluid discharged to the reservoir to the main pipe line through a reflux pipe line connecting the master cylinder and the pressure-increasing control valve in the reservoir and the main pipe line, and a motor driving the pump, and the control unit performs operation suppressing control for suppressing an operation of the motor when the upstream fluid pressure is high in execution of the brake pressurization control.

According to this, the control unit performs operation suppressing control for suppressing an operation of the motor when the upstream fluid pressure is high in execution of the brake pressurization control. Thus, when the upstream fluid pressure serving as an oil pressure of a discharge destination of the pump is high, the operation of the motor can be suppressed, and an increase in temperature of the motor is suppressed to make it possible to perform brake pressurization control for a long time.

BRIEF DESCRIPTION OF THE DRAWINGS

FIG. 1 is a diagram showing a basic configuration of a fluid pressure circuit of a brake system 1 according to a first embodiment of the present invention.

FIG. 2A is a basic flow chart of brake control executed in brake pressurization control.

FIG. 2B is a basic flow chart of brake control executed in brake pressurization control performed after the control in FIG. 2A.

FIG. 2C is a basic flow chart of brake control executed in brake pressurization control performed after the control in FIG. 2B.

FIG. 2D is a basic flow chart of brake control executed in brake pressurization control performed after the control in FIG. 2C.

FIG. 3 is a graph showing a relationship between a reservoir capacity, an off-road driving necessary oil volume, and each threshold value.

FIG. 4 is a graph showing a vehicle body speed and a vehicle wheel speed (target two wheels) on the upper side and showing an oil pressure given to W/Cs of the target two wheels on the lower side.

FIG. 5 is a time chart obtained when control described in a first embodiment is performed.

FIG. 6 is a flow chart of brake control executed in brake pressurization control (DAC control) in a brake system 1 according to a second embodiment of the present invention.

FIG. 7 is a flow chart of brake control executed in brake pressurization control (TRC control) in a brake system 1 according to a third embodiment of the present invention.

FIG. 8 is a flow chart of brake control (motor rotating speed variable) executed in brake pressurization control in a brake system 1 according to a fourth embodiment of the present invention.

FIG. 9 is a time chart obtained when control described in the fourth embodiment is performed.

DESCRIPTION OF EMBODIMENTS (First Embodiment)

A brake system constituting a vehicle braking control device according to a first embodiment of the present invention will be described below. FIG. 1 is a diagram showing a basic configuration of a fluid pressure circuit of a brake system 1 according to the embodiment. In this case, although an example in which the brake system 1 according to the first embodiment of the present invention is applied to a vehicle constituting a fluid pressure circuit of front and rear pipings will be described, the brake system 1 can also be applied to a vehicle having an X piping or the like.

In the brake system 1 shown in FIG. 1, when a brake pedal 11 serving as a brake operation member is operated, a booster (booster device) 12 to which a brake fluid pressure from an auxiliary pressure source 100 (will be described later) is transmitted pressurizes and assists operation force of the brake pedal 11 to generate an M/C pressure in a master cylinder (to be referred as an M/C hereinafter) 13. For example, a stroke sensor 11a detecting an operation amount of the brake pedal 11 is disposed, and in a normal braking state, the auxiliary pressure source 100 operates such that an assisting pressure determined based on a detection result in the stroke sensor 11a is generated, pressurization and assistance of the M/C pressure are performed, and an M/C pressure higher than an M/C pressure generated by only the operation force of the brake pedal 11 is generated. More specifically, a master piston (not shown) in the M/C 13 is pressed by the operation force and assisting force (force corresponding to assisting pressure), and equal M/C pressures can be generated in a primary chamber and a secondary chamber which are partitioned by the master piston. The M/C pressure is transmitted to wheel cylinders (to be referred to as W/Cs hereinafter) 14, 15, 34, and 35 through a brake fluid pressure control actuator 50 constituting a fluid pressure adjusting unit.

In the embodiment, the booster 12 is of a hydro-booster type. The hydro-booster type booster 12, in a normal braking state, pressurizes and assists the M/C pressure by a servo pressure which is an assisting pressure given from the auxiliary pressure source 100 and determined based on a detection result in the stroke sensor 11a. The booster 12 may be of an electric-booster type. The electric-booster type booster, in a normal braking state, pressurizes and assists an M/C pressure by assisting force given from the auxiliary pressure source 100 and determined based on a detection result in the stroke sensor 11a. At this time, the auxiliary pressure source 100 includes an electric motor such that the master piston is linearly moved by the electric motor.

The M/C 13 includes a master reservoir 13a having a path communicating with the primary chamber and the secondary chamber.

The brake system 1 may be of a type which does not pressurize and assist the M/C pressure and takes in and outputs a pressure from a pressure source constituted by a pump, an accumulator, and the like depending on an operation amount of the brake pedal 11.

The brake fluid pressure control actuator 50 has a first piping system 50a and a second piping system 50b, and is integrally configured by assembling various parts on a block (not shown) made of aluminum or the like. The first piping system 50a is a rear system for controlling a brake fluid pressure applied to the rear left wheel RL and the rear right wheel RR, and the second piping system 50b is a front system for controlling a brake fluid pressure applied to the front left wheel FL and the front right wheel FR.

Since the systems 50a and 50b have the same basic configurations, the first piping system 50a will be described below, and the second piping system 50b will not be described.

The first piping system 50a includes a pipe line A serving as a main pipe line which transmits the M/C pressure to the W/C 14 disposed on the rear left wheel RL and the W/C 15 disposed on the rear right wheel RR to generate a W/C pressure.

The pipe line A is branched into two pipe lines A1 and A2 on the W/C 14 side and the W/C 15 side. The pipe line A1 includes a first pressure-increasing control valve 17 for controlling an increase in brake fluid pressure to the W/C 14, and the pipe line A2 includes a second pressure-increasing control valve 18 for controlling an increase in brake fluid pressure to the W/C 15.

The first and second pressure-increasing control valves 17 and 18 are configured by 2-position electromagnetic valves which can control a communication/blocked state. More specifically, the first and second pressure-increasing control valves 17 and 18 are a normal-open type, i.e., the first and second pressure-increasing control valves are set in a communication state when a control current to a corresponding built-in solenoid coil is set to zero (non-energization state) and are set in a blocked state when the control current flows in the corresponding solenoid coil (energization state).

In the pipe line B serving as a pressure-reducing pipe line connecting the first and second pressure-increasing control valves 17 and 18 in the pipe line A and the W/Cs 14 and 15, a first pressure-reducing control valve 21 and a second pressure-reducing control valve 22 configured by 2-position electromagnetic valves which can control the communication/blocked states are disposed. More specifically, the first and second pressure-reducing control valves 21 and 22 are of a normal-close type, i.e., the first and second pressure-increasing control valves are set in a blocked state when a control current to a corresponding built-in solenoid coil is set to zero (non-energization state) and are set in a communication state when the control current flows in the corresponding solenoid coil (energization state).

A pipe line C serving as a reflux pipe line connecting the first and second pressure-increasing control valves 17 and 18 in the pipe line A and the M/C 13 to a reservoir 20 is disposed. A self-priming pump 19 which takes in or discharges a brake fluid from the reservoir 20 to the M/C 13 side or the W/C 14 side and the W/C 15 side is disposed in the pipe line C. The pump 19 is driven by a motor 60, and the motor 60 is driven by controlling energization to a motor relay (not shown).

Although the first piping system 50a has been described above, the second piping system 50b has the same configuration as that of the first piping system 50a, the second piping system 50b also includes the components included in the first piping system 50a. More specifically, third and fourth pressure-increasing control valves 37 and 38 correspond to the first and second pressure-increasing control valves 17 and 18, third and fourth pressure-reducing control valves 41 and 42 correspond to the first and second pressure-reducing control valves 21 and 22, a pump 39 corresponds to the pump 19, a reservoir 40 corresponds to the reservoir 20, and pipe lines E to G correspond to the pipe lines A to C.

With respect to the W/Cs 14, 15, 34, and 35 to which the systems 50A and 50b supply a brake fluid, the capacity (in particular, the reservoir 40) of the second piping system 50b serving as the front system can be made larger than that of the first piping system 50a serving as the rear system. In this manner, stronger braking force can be generated on the front side. A rear system and a front system in a track or the like have equal capacities, and the systems 50a and 50b have the same configurations.

Furthermore, as shown in FIG. 1, the fluid pressure circuit of the brake system 1 according to the embodiment includes, in addition to the brake fluid pressure control actuator 50, the auxiliary pressure source 100 which generates an arbitrary M/C pressure independently of an operation of the brake pedal 11. The auxiliary pressure source 100 acts on the M/C 13 or takes in a pressure from the pressure source to make it possible to generate an arbitrary upstream fluid pressure (M/C pressure) which is a brake pressure input from the M/C 13 side of the brake fluid pressure control actuator 50 independently of the operation of the brake pedal 11. The auxiliary pressure source 100 includes a fluid pressure pump, an accumulator, an electric motor, a pressure sensor, first and second control valves, and the like (all of which are not shown).

The fluid pressure pump is driven by the electric motor and takes in/discharges a brake fluid in the master reservoir 13a. The brake fluid discharged by the fluid pressure pump is supplied to the accumulator, and a brake fluid pressure is accumulated. The brake fluid pressure accumulated in the accumulator corresponds to an accumulator pressure, and is transmitted to the booster 12 as the brake fluid pressure to pressurize and assist the operation force of the brake pedal 11. The pressure sensor monitors the accumulator pressure.

The first control valve transmits the accumulator pressure to the booster 12 in the communication state to pressurize and assist the M/C pressure, and stops the transmission of the accumulator pressure in the blocked state. For example, in a normal brake state, the first control valve is set in a communication state for a time required to generate a servo pressure such that the servo pressure which is a predetermined assisting pressure is generated depending on a detection result of the stroke sensor 11a, so that the M/C pressure is pressurized and assisted. When the brake pressurization control is performed, regardless of a detection result of the stroke sensor 11a, the first control valve is set in a communication state such that a predetermined servo pressure is generated based on the control request. In this manner, the M/C pressure which is the upstream fluid pressure input from the M/C 13 side to the brake fluid pressure control actuator 50 is generated.

The second control valve is designed to be able to perform pressure-reducing adjustment of the M/C pressure by returning a brake fluid generating a servo pressure which is a predetermined assisting pressure from the booster 12 to the master reservoir 13a when the second control valve is set in a communication state.

The brake pressurization control means that braking force is generated by generating a W/C pressure based on a control request to perform vehicle control. For example, the brake pressurization control corresponds to traction control suppressing slips of vehicles in acceleration, control called downhill assist control (to be referred to as DAC(Downhill Assist Control) control hereinafter) in which a vehicle body speed is kept at a constant speed on a down-grade hill, control called crawl control (CRAWL Control) in which a vehicle speed is kept at a constant speed on a road surface such as an off road (sand, dirt, or rocky road), a snowy road, or a steep road on which speed adjustment is required.

In this manner, the fluid pressure circuit of the brake system 1 according to the embodiment is configured. Furthermore, the brake system 1 according to the embodiment, as shown in FIG. 1, includes an electronic control device (to be referred to as a brake ECU hereinafter) 70 for brake control as a control unit controlling the fluid pressure circuit of the brake system 1. The brake ECU 70 receives a detection signal of the stroke sensor 11a, detection signals of vehicle wheel speed sensors Srl, Srr, Sfl, and Sfr, and the like, performs various arithmetic operations based on the signals, and controls various control valves 17, 18, 21, 22, 37, 38, 41, and 42 and the motor 60. In this manner, the M/C pressure is pressurized and assisted, and W/C pressures generated by the W/Cs 14, 15, 34, and 35 of the vehicle wheels FL to RR are adjusted.

For example, the brake ECU 70, based on the detection signal of the stroke sensor 11a in a normal brake state and based on a control request in a brake pressurization control state, communicates the first control valve of the auxiliary pressure source 100 and communicates the second control valve of the auxiliary pressure source 100 as needed to pressurize and assist the M/C pressure. In this manner, based on the pressurized and assisted M/C pressure, in a normal brake state, braking force depending on an operation amount of the brake pedal 11 by a driver is generated. In a brake pressurization control state, braking force depending on a control request is generated. At this time, when the braking force depending on the control request is generated, the brake ECU 70, as operation suppressing control to suppress an operation of the motor 60 in execution of the brake pressurization control, various controls (1) to (4) (will be described later) are executed.

(1) In the brake pressurization control state, although W/C pressures required for the vehicle wheels FL to RR are generated based on a control request of the brake pressurization control, the W/C pressures obtained at this time are designed to be generated by pressurization and assistance of the M/C pressure by the auxiliary pressure source 100. In this manner, for example, in comparison with a case in which the brake fluid pressure control actuator 50 has a pressurization function to generate the W/C pressures by the operations of the pumps 19 and 39, an operation frequency of the motor 60 can be reduced. Thus, the temperature of the motor 60 is suppressed from increasing to make it possible to perform brake pressurization control for a long time.

At this time, in the brake ECU 70, the first and second control valves are controlled such that the M/C pressure serving as an upstream fluid pressure is the maximum pressure of the W/C pressures required for the vehicle wheels FL to RR, and the W/C pressures are adjusted by the M/C pressure. More specifically, while a high M/C pressure is generated by the auxiliary pressure source 100 disposed on an upstream side of the M/C 13, the M/C pressure is not lowered to the brake fluid pressure required as the W/C pressures for the vehicle wheels FL to RR by the operation of the brake fluid pressure control actuator 50 disposed on a downstream side of the M/C 13, and the M/C pressure is adjusted to the maximum pressure of the W/C pressures for the vehicle wheels FL to RR, from the beginning.

In this manner, an unnecessary high M/C pressure is not generated. Furthermore, when the W/C pressures for the vehicle wheels FL to RR are to be generated, a high M/C pressure need not be reduced to be used as the W/C pressure. For this reason, amounts of brake fluid discharged to the reservoirs 20 and 40 through the pressure-reducing control valves 21, 22, 41, and 42 can be reduced. Thus, the operation frequency of the motor 60 driving the pumps 19 and 39 pumping brake fluids discharged to the reservoirs 20 and 40 can be reduced, the temperature of the motor 60 is suppressed from increasing to make it possible to perform brake pressurization control for a long time.

(2) As in the control (1) described above, when the M/C pressure is adjusted to the maximum value of the W/C pressures required for the vehicle wheels FL to RR, with respect to, the vehicle wheels FL to RR, a vehicle wheel the W/C pressure of which is lower than the maximum pressure, the W/C pressure is lowered to the necessary W/C pressure by the operation of the brake fluid pressure control actuator 50 disposed on the downstream side of the M/C 13. With respect to, of the vehicle wheels FL to RR, the vehicle wheel the W/C pressure of which is set to the maximum pressure, a brake fluid pressure is not adjusted by the operation of the brake fluid pressure control actuator 50.

In this manner, with respect to, of the vehicle wheels FL to RR, the vehicle wheel the W/C pressure of which is set to the maximum pressure, brake fluids need not be discharged to the reservoirs 20 and 40. With respect to, of the vehicle wheels FL to RR, the vehicle wheel the W/C pressure of which is not set to the maximum pressure, the WIC pressure need only be reduced from the maximum pressure. For this reason, in comparison with a case in which the M/C pressure higher than the maximum pressure is generated and reduced to obtain a desired W/C pressure, flow rates of the brake fluids to the reservoirs 20 and 40 can be suppressed. For this reason, the frequency of operations of the motor 60 to draw the brake fluids from the reservoirs 20 and 40 can be reduced, and the temperature of the motor 60 can be suppressed from increasing to make it possible to perform the brake pressurization control for a longer time.

The controls (1) and (2) correspond to, of operation suppressing controls, pressure-reducing suppressing controls for suppressing brake fluids from being discharged to the reservoirs 20 and 40 in the pressure-reducing control in the brake pressurization control.

(3) As in the control (2) described above, when the W/C pressures for the vehicle wheels FL to RR are controlled by the brake fluid pressure control actuator 50 disposed on the downstream side of the M/C 13, reservoir fluid volumes accumulated in the reservoirs 20 and 40 are estimated. When the estimated reservoir fluid volumes are larger than starting threshold values set to values equal to or smaller than the reservoir capacities the brake fluids of which can be accumulated in the reservoirs 20 and 40, the motor 60 is driven to draw the brake fluids in the reservoirs 20 and 40, and the motor 60 is stopped when the reservoir fluid volumes become stop threshold values, for example, 0.

In this manner, a frequency of operations of the motor 60 to draw the brake fluids accumulated in the reservoirs 20 and 40 can be further reduced. Thus, the temperature of the motor 60 is further suppressed from increasing to make it possible to perform brake pressurization control for a longer time.

(4) In the control (3) described above, in execution of the brake pressurization control, when an M/C pressure P_mc which is an upstream fluid pressure becomes higher, operation suppressing control for suppressing the operation of the motor 60 is performed. More specifically, when the M/C pressure P_me which is the upstream fluid pressure is high, at least the starting threshold value is set to be higher than that set when the M/C pressure P_mc is low.

When the pumps 19 and 39 pump brake fluid, in comparison with a case in which an upstream fluid pressure which is a pressure at a place to which the brake fluid is pumped is low, a load (driving torque) on the motor 60 driving the pumps 19 and 39 increases when the upstream fluid pressure is high, and a current value input to the motor 60 also increases. However, when the control (4) is performed, the frequency of operations of the motor 60 to draw the brake fluids accumulated in the reservoirs 20 and 40 when the M/C pressure serving as the upstream fluid pressure can be further reduced. Thus, the temperature of the motor 60 is further suppressed from increasing to make it possible to perform brake pressurization control for a longer time.

More specifically, when the M/C pressure P_mc is high, the stop threshold value is set to be higher than that set when the M/C pressure P_mc is low in accordance with the starting threshold value.

In this manner, the operation time of the motor 60 to draw the brake fluids accumulated in the reservoirs 20 and 40 can be further reduced. Thus, the temperature of the motor 60 is further suppressed from increasing to make it possible to perform brake pressurization control for a longer time.

Subsequently, the details of control of the auxiliary pressure source 100 and the brake fluid pressure control actuator 50 in a brake pressurization control executed as described above will be described below. FIGS. 2A to 2D are basic flow charts of brake control executed in brake pressurization control. The processes shown in the drawings are executed at a predetermined control cycle. Although DAC control will be exemplified as an example of the brake pressurization control, another brake pressurization control is also performed by the same manner.

The brake ECU 70 performs an each-wheel-fluid-pressure acquiring process for acquiring current W/C pressures CurrentPressFL to CurrentPressRR for the vehicle wheels FL to RR in step S102. For example, the wheel fluid pressures may be designed to be acquired from W/C pressure sensors (not shown) disposed for the W/Cs 14, 15, 34, and 35 to detect the W/C pressures, or the W/C pressures CurrentPressFL to CurrentPressRR for the vehicle wheels FL to RR may be designed to be acquired from a W/C pressure estimating unit for estimating the W/C pressures. W/C pressure estimation can be performed such that, based on the operation times of the pressure-reducing control valves 21, 22, 41, and 42 corresponding to target wheels, a reduced pressure amount from the M/C pressure is calculated by subtracting the reduced pressure amount from the M/C pressure.

The brake ECU 70 performs an each-wheel-target-fluid-pressure acquiring process for acquiring target W/C pressures TargetPressFL to TargetPressRR for the vehicle wheels FL to RR based on DAC control in next step S104. With respect to this, since the fluid pressures are determined by a control request from the DAC control, values given by the control request need only be set to the target W/C pressures TargetPressFL to TargetPressRR. More specifically, in the DAC control, since the target W/C pressures for the vehicle wheels FL to RR required to make a vehicle speed a reference speed set by a driver, the target W/C pressures are defined as the target W/C pressures TargetPressFL to TargetPressRR in this step.

The brake ECU 70, in step S106, performs an upstream target pressure calculation for calculating an upstream target pressure TargetMaxPress(n) generated by the auxiliary pressure source 100 disposed on the upstream side of the M/C 13. More specifically, by using the following equation, the maximum value is selected from the target W/C pressures TargetPressFL to TargetPressRR acquired in step S106. The upstream target pressure TargetMaxPress(n) is the M/C pressure to be generated by the M/C 13. "n" in the upstream target pressure TargetMaxPress(n) is a natural number, and means a current arithmetic process (control process).

$$\text{TargetMaxPress}(n)=\text{MAX}(\text{TargetPressFL}, \text{TargetPressFR}, \text{TargetPressRL}, \text{TargetPressRR}) \quad \text{(Equation 1)}$$

The brake ECU 70 proceeds to step S108 to perform an upstream target pressure variable amount calculation. More specifically, based on Equation 2, on the basis of a calculation result in step S106, an upstream target pressure variable amount $\Delta\text{TargetMaxPress}(n)$ is calculated from a difference between the upstream target pressure TargetMaxPress(n) in a current control process and an upstream target pressure TargetMaxPress(n−1) in a previous control process. The upstream target pressure variable amount $\Delta\text{TargetMaxPress}(n)$ is filtered to obtain a filtered upstream target pressure variable amount $\Delta\text{TargetMaxPressF}(n)$. The filtering process mentioned here is a process to moderate a change of the upstream target pressure variable amount $\Delta\text{TargetMaxPress}(n)$, for example, performs filtering by using a low-pass filter. "$\Delta T$" in Equation 2 represents a control cycle.

$$\Delta\text{TargetMaxPress}(n)=(\text{TargetMaxPress}(n)-\text{TargetMaxPress}(n-1))/\Delta T \quad \text{(Equation 2)}$$

The brake ECU 70 proceeds the program to step S110. Although processes in steps S110 to S130 are written as one process here, the processes are performed to each of the vehicle wheels FL to RR once. "" shown in the following explanation and the drawings are signs expressing the vehicle wheels FL to RR as a whole. For example, when the processes shown in steps S110 to S130 are executed to the front left wheel FL, "" indicates "FL".

In step S110, the brake ECU 70 calculates a deviation (to be referred to as a pressure deviation hereinafter) between the upstream target pressure TargetMaxPress(n) and a target W/C pressure TargetPress** of each of the vehicle wheels FL to RR, and it is determined whether the pressure deviation exceeds a difference pressure threshold value DiffPress considered as a magnitude requiring difference pressure adjustment. When NO is determined in step S110, the brake ECU 70 proceeds to step S112 because this determination means that the deviation is not large and the difference pressure adjustment is not required, as control (to be referred to as downstream control hereinafter) of the brake fluid pressure control actuator 50 disposed on the downstream side of the M/C 13, a pressure-increasing mode is set for a part corresponding to a target wheel in the brake fluid pressure control actuator 50. More specifically, the brake ECU 70 sets a mode in which a pressure-increasing control valve corresponding to a target wheel of the pressure-increasing control valves 17, 18, 37, and 38 in a full-on state in which the pressure-increasing control valve is set in an always-on state and the M/C pressure is set in a pressure-increasing state in which the M/C pressure is directly applied as the W/C pressure for the target wheel.

In this case, since no brake fluid is discharged to the reservoirs 20 and 40, the brake ECU 70 proceeds to step S114 to directly set a reservoir fluid volume EstReserv*(n−1) in the previous control process to a reservoir fluid volume EstReserv*(n) in the current control process. "*" used when a reservoir fluid volume or the like is shown means the reservoirs 20 and 40 of the first and second piping systems 50a and 50b, and shows "1" or "2" indicating each piping system. More specifically, a brake fluid is discharged to only one of the reservoirs 20 and 40 even in different wheels in the same piping system. For this reason, the brake fluid is discharged or drawn, an amount of brake fluid discharged to the reservoirs 20 and 40 of the piping system to which each wheel of the vehicle wheels FL to RR belongs is added, or an amount of drawn fluid is subtracted to calculate (estimate) the reservoir fluid volumes accumulated in the reservoirs 20 and 40.

On the other hand, when YES is determined in step S110, since it means that the pressure deviation has a magnitude requiring difference pressure adjustment, the brake ECU 70 proceeds to step S116 to determine whether a deviation (to be referred to as each-wheel deviation hereinafter) between the target W/C pressure TargetPress of each of the vehicle wheels FL to RR and a current W/C pressure CurrentPress exceeds the difference pressure threshold value DiffPress.

When YES is determined, since this determination means that the current W/C pressure CurrentPress is smaller than a target W/C TargetPress, the brake ECU 70 proceeds to step S118 to perform, as downstream control, pressure-increasing control for a part corresponding to a target wheel in the brake fluid pressure control actuator 50. More specifically, the brake ECU 70 increases the W/C pressure of the target wheel moderately more than that when the pressure-increasing mode is set in step S114. More specifically, since the target wheel in this step is not a wheel for which the target W/C pressure TargetPress** is the maximum pressure, but a wheel for which the W/C pressure is desired to be increased, the W/C pressure need only be relatively moderately increased. For this reason, the brake ECU 70 pulse-increases a pressure corresponding to the target wheel of, for example, pressure-increasing control valves 17, 18, 37, and 38 or linearly adjusts an indicator current value to a solenoid to moderately increase the W/C pressure. In this case, since no brake fluid is discharged to the reservoirs 20 and 40, the brake ECU 70 proceeds to step S120 to directly set the reservoir fluid volume EstReserv*(n−1) in the previous control process to the reservoir fluid volume EstReserv*(n) in the current control process.

When NO is determined in step S116, the brake ECU 70 proceeds to step S122 to determine whether the each-wheel deviation is smaller than a negative difference pressure threshold value −DiffPress, i.e., the brake ECU 70 determines the current W/C pressure CurrentPress exceeds the target W/C pressure TargetPress. When NO is determined in step S122, since the current W/C pressure CurrentPress is not largely different from the target W/C TargetPress, the brake ECU 70 proceeds to step S124 to perform holding control as the downstream control. In this manner, the brake ECU 70 sets a pressure-increasing control valve, for example, of the pressure-increasing control valves 17, 18, 37, and 38, corresponding to the target wheel in a blocked state to hold the current W/C pressure CurrentPress. In this case, since no brake fluid is discharged to the reservoirs 20 and 40, the brake ECU 70 proceeds to step S126** to directly set the reservoir fluid volume EstReserv*(n−1) in the previous control process to the reservoir fluid volume EstReserv*(n) in the current control process.

When YES is determined in step S122, the current W/C pressure CurrentPress exceeds the target W/C TargetPress, and the brake ECU 70 needs to reduce the W/C pressure of the target wheel. For this reason, the brake ECU 70 proceeds to step S128 to perform pressure-reducing control as the downstream control. In this manner, the brake ECU 70 sets a valve, for example, of the pressure-reducing control valves 21, 22, 41, and 42, corresponding to the target wheel in a communication state to reduce the current W/C pressure CurrentPress. In this case, the brake fluid to be reduced is discharged to the reservoirs 20 and 40 consequently, the brake ECU 70 proceeds to the step S130 to perform a reservoir fluid volume estimating process. For example, the brake ECU 70** calculates the reservoir fluid volume EstReserv*(n) in the current control process by adding the reduced amount in the current control process to the reservoir fluid volume EstReserv*(n−1) in the previous control process.

Thereafter, the brake ECU 70 proceeds to step S132 to set an off-road driving necessary oil volume depending on a type of brake pressurization control and to set threshold values at a plurality of levels. The off-road driving necessary oil volume includes an off-road driving necessary oil volume V_f of the reservoir 40 and an off-road driving necessary oil volume V_r of the reservoir 20. The threshold values at the plurality of levels according to the reservoir 40 include a high-pressure threshold value V_f_hi, an intermediate-pressure threshold value V_f_mid, and a low-pressure threshold value V_f_lo. The threshold values at the plurality of levels according to the reservoir 20 include a high-pressure threshold value V_r_hi, an intermediate-pressure threshold value V_r_mid, and a low-pressure threshold value V_r_lo.

A relationship between a reservoir capacity, the off-road driving necessary oil volume, and each threshold value will be described below with reference to FIG. 3. The reservoir 40 will be described below, and the reservoir 20 will not be described because the explanation of the reservoir 20 is the same as that of the reservoir 40. The capacity of the reservoir 40 is a reservoir capacity V_reserv. The reservoir capacity V_reserv is designed to correspond to a brake fluid volume necessary to cause ABS control to act on the four wheels when a high-traveling road surface changes into a low-traveling road surface to reduce the W/C pressure to a W/C pressure at which the wheels are not locked on a low-μ road. The capacity of the reservoir 40 may be equal to that of the reservoir 20 or larger than that of the reservoir 20.

The off-road driving necessary oil volume V_f corresponds to a brake fluid volume at which, in off-road driving, a vehicle can travel at a constant speed (travel while a vehicle body speed is kept at a constant speed) by DAC control up to a down-grade hill having a predetermined inclination (for example, 25 degrees (0.42 G). Since deceleration slip on off-road driving occurs on diagonal two wheels, the off-road driving necessary oil volume is designed to correspond to a proper brake fluid volume used when the DAC control acts on the two wheels to suddenly decelerate the wheels. More specifically, the vehicle body speed is a constant speed, and, when, for example, the wheel speed of one wheel decreases (when one wheel floats from the ground), the wheel is suddenly decelerated. At this time, in order to prevent the deceleration slip, the brake fluid is drawn until the oil pressure becomes 0 Mpa, braking force is short when the wheel is grounded again to increase the vehicle speed. For this reason, the proper brake fluid volume is preferably approximately half a brake fluid volume necessary to maintain the constant speed.

A value obtained by subtracting the off-road driving necessary oil volume V_f from the reservoir capacity V_reserv is the high-pressure threshold value V_f_hi which is an upper limit of the threshold values. The high-pressure threshold value V_f_hi may be changed depending on an inclination of a slope road. The intermediate-pressure threshold value V_f_mid is set to ⅔ of the high-pressure threshold value V_f_hi. The low-pressure threshold value V_f_lo is set to ⅓ of the high-pressure threshold value V_f_hi. The threshold values at the plurality of levels according to the reservoir 40 are at three levels, i.e., a high-pressure threshold value V_f_hi, an intermediate-pressure threshold value V_f_mid, and a low-pressure threshold value V_F_lo. Setting of the number of levels of the threshold values may be changed depending on the magnitude of the reservoir capacity V_reserv.

When acceleration slip occurs in off-road driving, a pressure necessary to stop the slip by TRC control or the like is about 5 MPa (changed depending on vehicles). Furthermore, the vehicle wheel speeds of the diagonal two wheels of, for example, a four-wheel-drive vehicle becomes higher than the vehicle body speed such that the cycles of the two wheels are different from each other as indicated by a solid line and a chain line in FIG. 4. In order to stop the acceleration slip, as shown in FIG. 4, an oil pressure depending on a difference speed between the vehicle wheel speed and the vehicle body speed is applied as shown in FIG. 4. At this time, a reduction in pressure corresponding to the cycle difference is required, and corresponds to the off-road driving necessary oil volume.

When the brake pressurization control is neither DAC control nor TRC control (for example, ABS control), NO is determined in steps S132 and S134, the brake ECU 70 causes the program to proceed to step S136. In step S136, the brake ECU 70 sets the off-road driving necessary oil volumes V_f and V_r to V_reserv each. For example, this is because, during the ABS control, the motor 60 does not operate for a long time and may be in an always-on state.

When the brake pressurization control is not DAC control but TRC control, NO is determined in step S132 and YES is determined in step S134, and the brake ECU 70 causes the program to proceed to step S138. In step S138, the brake ECU 70 sets the off-road driving necessary oil volume V_f and the off-road driving necessary oil volume V_r to V_trc_f and V_trc_r, respectively.

When the brake pressurization control is DAC control and is not TRC control, YES is determined in step S132 and NO is determined in step S140, and the brake ECU 70 causes the program to proceed to step S142. In step S142, the brake ECU 70 sets the off-road driving necessary oil volume V_f and the off-road driving necessary oil volume V_r to V_dac_f and V_dac_r, respectively.

When the brake pressurization control is DAC control and also TRC control (simultaneous operation state), YES is determined in steps S132 and S140, the brake ECU 70 causes the program to proceed to step S144. In step S144, the brake ECU 70 uses the following equation to select the maximum value of the values V_dac_f and V_trc_f as the off-road driving necessary oil volume V_f. The brake ECU 70 uses the following equation to select the maximum value of the values V_dac_r and V_trc_r as the off-road driving necessary oil volume V_r.

$$V\_f = \mathrm{MAX}(V\_dac\_f, V\_trc\_f)$$

$$V\_r = \mathrm{MAX}(V\_dac\_r, V\_trc\_r) \quad \text{(Equation 3)}$$

Furthermore, the brake ECU 70, in step S146, sets threshold values at a plurality of levels. More specifically, the brake ECU 70 sets a value obtained by subtracting the off-road driving necessary oil volume V_f from the reservoir capacity V_reserv as the high-pressure threshold value V_f_hi, sets ⅔ of the high-pressure threshold value V_f_hi as the intermediate-pressure threshold value V_f_mid, and sets ⅓ of the high-pressure threshold value V_f_hi as the low-pressure threshold value V_f_lo. The brake ECU 70 sets a value obtained by subtracting the off-road driving necessary oil volume V_r from the reservoir capacity V_reserv as the high-pressure threshold value V_r_hi, sets ⅔ of the high-pressure threshold value V_r_hi as the intermediate-pressure threshold value V_r_mid, and sets ⅓ of the high-pressure threshold value V_r_hi as the low-pressure threshold value V_r_lo.

The brake ECU 70 proceeds to step S148 to determine a starting threshold value and a stop threshold value depending on M/C pressures. The starting threshold value is a threshold value to start driving of the motor 60 and corresponds to a state (for example, a reservoir is almost full) in which the reservoir fluid volume EstReserv*(n) is should be drawn. The stop threshold value is a threshold value to stop driving of the motor 60 and corresponds to a state (for example, a reservoir is empty) in which drawing of the reservoir fluid volume EstReserv*(n) should be stopped.

When the M/C pressure P_mc calculated in step S106 is a determination threshold value P_lo or less, NO is determined in steps S148 and S150, the brake ECU 70 causes the program to proceed to step S152. The brake ECU 70, in step S152, sets a starting threshold value V_f_on to a low-pressure threshold value V_f_lo and sets a stop threshold value V_f_off to 0. The brake ECU 70, in step S152, sets a starting threshold value V_r_on to a low-pressure threshold value V_r_lo and sets a stop threshold value V_r_off to 0.

When the M/C pressure P_mc is larger than the determination threshold value P_lo and equal to or smaller than a determination threshold value P_hi, NO is determined in step S148, and YES is determined in step S150, the brake ECU 70 causes the program to proceed to step S154. The determination threshold value P_hi is set to a value larger than the determination threshold value P_lo. The brake ECU 70, in step S154, sets the starting threshold value V_f_on to the intermediate-pressure threshold value V_f_mid and sets the stop threshold value V_f_off to the low-pressure threshold value V_f_lo. The brake ECU 70, in step S154, sets a starting threshold value V_r_on to the intermediate-pressure threshold value V_r_mid and sets a stop threshold value V_r_off to the low-pressure threshold value V_r_lo.

When the M/C pressure P_mc is larger than the determination threshold value P_hi, YES is determined in step S148, and the brake ECU 70 causes the program to proceed to step S156. The brake ECU 70, in step S156, sets the starting threshold value V_f_on to the high-pressure threshold value V_f_hi and sets the stop threshold value V_f_off to the intermediate-pressure threshold value V_f_mid. The brake ECU 70, in step S156, sets the starting threshold value V_r_on to the high-pressure threshold value V_r_hi and sets the stop threshold value V_r_off to the intermediate-pressure threshold value V_r_mid.

Thereafter, the brake ECU 70 proceeds to step S158 to determine whether the motor 60 in the brake fluid pressure control actuator 50 disposed on the downstream side of the M/C 13 is driven (ON), i.e., whether brake fluids are drawn from the reservoirs 20 and 40. When YES is determined in step S158, the brake ECU 70 proceeds to step S160 to correct the reservoir fluid volume EstReserv*(n) and proceeds to step S162. When NO is determined in step S158, the brake ECU 70 directly proceeds to step S162. More specifically, the brake ECU 70, in step S160, sets a value obtained by subtracting a motor drive flow rate serving as an amount of drawn brake fluid by driving the motor 60 from the reservoir fluid volume EstReserv*(n) set in steps S114, S120, S126, and S130.

However, since this value is not a negative value, as in Equation 4, a larger value of the reservoir fluid volume EstReserv*(n) and 0 is employed to prevent the reservoir fluid volume EstReserv*(n) from being a negative value.

$$\text{EstReserv}^*(n) = \mathrm{MAX}(\text{EstReserv}^*(n) - \text{Motor Drive Flow Rate}, 0) \quad \text{(Equation 4)}$$

In next step S162, the brake ECU 70 determines whether a reservoir fluid volume EstReserv1(n) of the reservoir 20 exceeds the starting threshold value V_f_on or whether a reservoir fluid volume EstReserv2(n) of the reservoir 40 exceeds the starting threshold value V_r_on. In the brake ECU 70, a part performing the determination corresponds to a reservoir capacity determination means. When YES is determined here, the brake ECU 70 proceeds to step S164 to drive (ON) the motor 60 in the brake fluid pressure control actuator 50 disposed on the downstream side of the M/C 13. In this manner, brake fluids in the reservoirs 20 and 40 are drawn to make it possible to reduce the reservoir fluid volumes.

When NO is determined in step S162, or after the process in step S164 is performed, the brake ECU 70 proceeds to step S166 to determine whether the reservoir fluid volume EstReserv1(n) of the reservoir 20 is the stop threshold value V_f_off and whether the reservoir fluid volume EstReserv2(n) of the reservoir 40 is the stop threshold value V_r_off. When YES is determined in step S168, the brake ECU 70 proceeds to step S168, stops (OFF) the motor 60, and then ends the process. On the other hand, when NO is determined in step S168, the brake ECU 70 ends the process.

Furthermore, an operation of the vehicle braking control device configured as described above will be described below with reference to the time chart shown in FIG. 5. FIG. 5 shows an example of a time chart of an M/C pressure P_mc generated by the auxiliary pressure source 100 when the above controls are performed, W/C pressures for the two wheels FL and FR of the second piping system 50b, a reservoir fluid volume accumulated in the reservoir 40, and the motor 60. Here, for the sake of simplification, the case in which an M/C pressure generated by the auxiliary pressure source 100 based on the W/C pressures of the two wheels FL and FR of the second piping system 50b is shown. However, the M/C pressure is actually generated based on the W/C pressures for the four wheels FL to RR.

As shown in FIG. 5, the maximum pressure of the W/C pressures for the wheels FL and FR determined by a control request from the brake pressurization control is set to the M/C pressure P_mc generated by the auxiliary pressure source 100. The W/C pressure for the wheel FL is indicated by a chain line, and the W/C pressure for the wheel FR is indicated by a broken line. Furthermore, the starting threshold value V_f_on and the stop threshold value V_f_off are set by comparing the M/C pressure P_mc with the determination threshold value P_hi and the determination threshold value P_lo. The starting threshold value V_f_on is indicated by a broken line, and the stop threshold value V_f_off is indicated by a chain line.

The W/C pressure of each of the wheels FL and FR is lower than the maximum pressure, the pressure-reducing control valves 41 and 42 on the target wheel side are set in a communication state to discharge the brake fluid to the reservoir 40 side so as to decrease the W/C pressure. At this time, although the brake fluid is gradually accumulated in the reservoir 40, the motor 60 is not driven until the reservoir fluid volume exceeds the starting threshold value V_f_on, and is driven when the reservoir fluid volume exceeds the starting threshold value V_f_on. Although the brake fluid is drawn from the reservoir 40, the motor 60 is not stopped until the reservoir fluid volume reaches the stop threshold value V_f_off, and is stopped when the reservoir fluid volume reaches the stop threshold value V_f_off.

As is apparent from the above explanation, the vehicle braking control device according to the first embodiment includes: the M/C 13 which generates a M/C pressure based on an operation of the brake pedal 11 (brake operation member); W/Cs 14, 15, 34, 35 coupled to the M/C 13, disposed in response to the wheels FL to RR, generate W/C pressures to generate braking force to the wheels FL to RR; the brake fluid pressure control actuator 50 (fluid pressure adjusting unit) which is disposed between the M/C 13 and the W/Cs 14, 15, 34, and 35 and adjusts the W/C pressures; the auxiliary pressure source 100 which acts on the M/C 13 or takes in a pressure from a pressure source to make it possible to generate an arbitrary upstream fluid pressure (M/C pressure) serving as a brake pressure input from a M/C 13 side of the brake fluid pressure control actuator 50 regardless of the operation of the brake pedal 11; and a brake control device 70 (control unit) which uses the auxiliary pressure source 100 and the brake fluid pressure control actuator 50 to generate an upstream fluid pressure (M/C pressure) higher than a pressure based on an operation of the brake pedal 11 by the auxiliary pressure source 100 and executes brake pressurization control causing the brake fluid pressure control actuator 50 to generate arbitrary braking force for the wheels FL to RR, wherein the brake fluid pressure control actuator 50 includes the pressure-increasing control valves 17, 18, 37, and 38 which are disposed in the pipe line A and the pipe line E (main pipe line) connecting the M/C 13 and the W/Cs 14, 15, 34, and 35 to each other and control communication/blocking of the pipe line A and the pipe line E, the reservoirs 20 and 40 which discharge brake fluids from the pipe line A and the pipe line E through the pipe line B and a pipe line F (pressure-reducing pipe line) connected between the pressure-increasing control valves 17, 18, 37, and 38 and the W/Cs 14, 15, 34, and 35 in the pipe line A and the pipe line E, the pressure-reducing control valves 21, 22, 41, and 42 controlling communication/blocking of the pipe line B and the pipe line F, the pumps 19 and 39 returning the brake fluids discharged to the reservoirs 20 and 40 through the pipe line C and a pipe line G (reflux pipe line) coupling the reservoirs 20 and 40 and the M/C 13 and the pressure-increasing control valves 17, 18, 37, and 38 in the pipe line A and the pipe line E to the pipe line A and the pipe line E, and the motor 60 driving the pumps 19 and 39. The brake control device 70 performs operation suppressing control for suppressing an operation of the motor 60 when the upstream fluid pressure (M/C pressure) is high in execution of the brake pressurization control.

According to this, the brake control device 70 performs the operation suppressing control for suppressing an operation of the motor 60 when the upstream fluid pressure (M/C pressure) is high in execution of the brake pressurization control. Thus, when the upstream fluid pressures (M/C pressures) serving as oil pressures of discharge destinations of the pumps 19 and 39 are high, the operation of the motor 60 can be suppressed, and an increase in temperature of the motor 60 is suppressed to make it possible to perform brake pressurization control for a long time.

The brake control device 70 includes a reservoir capacity determination unit (steps S162 to S168) which determines whether reservoir fluid volumes serving as amounts of brake fluid accumulated in the reservoirs 20 and 40 exceed a predetermined starting threshold value and becomes a predetermined stop threshold value and a threshold value changing unit (steps S148 to S156) which sets, when the upstream fluid pressure (M/C pressure) is high, at least the starting threshold value to a value higher than that obtained when the upstream fluid pressure (M/C pressure) is low, and, as operation suppressing control, operates the motor 60 when the reservoir fluid volumes exceed the starting threshold value to draw the brake fluids from the reservoirs 20 and 40 and stops the motor 60 when the reservoir fluid volumes become the stop threshold value.

According to this, the brake control device 70 can reliably perform the operation suppressing control for suppressing an operation of the motor 60 when the upstream fluid pressure (M/C pressure) is high in execution of the brake pressurization control. Thus, the temperature of the motor 60 is reliably suppressed from increasing to make it possible to perform the brake pressurization control for a long time.

When the upstream fluid pressure (M/C pressure) is high, the brake control device 70 (threshold value changing unit) sets the stop threshold value to a value higher than that obtained when the upstream fluid pressure (M/C pressure) is low in accordance with the starting threshold value (steps S148 to S156).

According to this, since the stop threshold value is set in accordance with the starting threshold value, the operation time of the motor 60 can be further reduced. Thus, the temperature of the motor 60 is further suppressed from increasing to make it possible to perform brake pressurization control for a longer time.

In the embodiment described above, although the upstream fluid pressure (M/C pressure) is acquired as the upstream target pressure TargetMaxPress(n), a pressure sensor 50C detecting the M/C pressure may be disposed in the pipe line A (or pipe line E) of the brake fluid pressure control actuator 50 to acquire the M/C pressure from the pressure sensor 50C.

In the embodiment described above, the brake system 1 causes the auxiliary pressure source 100 to generate a master pressure in brake pressurization control and sets the master pressure as an upstream fluid pressure input to the M/C 13 side of the brake fluid pressure control unit 50. However, the embodiment is not limited to this configuration, and the brake system 1 may be obtained such that, for example, the auxiliary pressure source 100 takes in a necessary pressure from a pressure source configured by a pump, an accumulator, and the like in the brake pressurization control and sets the pressure as the upstream fluid pressure input to the M/C 13 side of the brake control unit 50.

(Second Embodiment)

A second embodiment of the present invention will be described below. The embodiment is obtained such that, in comparison with the first embodiment, the brake ECU 70 (threshold value changing unit), when brake pressurization control is DAC control, sets at least a starting threshold value to a higher value when the inclination of the slope road on which the vehicle travels is high, in comparison with when the inclination of the slope road on which the vehicle travels is low. Since the other configuration of the second embodiment is the same as that of the first embodiment, only different parts between the first embodiment and the second embodiment will be described below.

More specifically, the brake ECU 70 executes steps S202 and S204 in place of steps S148 and S150 in the first embodiment as shown in FIG. 6. In step S202, the brake ECU 70 determines whether the M/C pressure P_mc is larger than the determination threshold value P_hi or whether an absolute value |G_slope| of an inclination G_slope of a slope road on which a vehicle travels is larger than a determination threshold value G_hi. In step S204, the brake ECU 70 determines whether the M/C pressure P_mc is larger than the determination threshold value P_lo or whether the absolute value |G_slope| of the inclination G_slope of the slope road on which the vehicle travels is larger than a determination threshold value G_lo. The determination threshold value G_hi is set to a value larger than the determination threshold value G_lo. For example, the inclination G_slope of the slope road on which the vehicle travels is calculated from a detection result detected by an acceleration sensor.

More specifically, the brake ECU 70, when the absolute value |G_slope| is the determination threshold value G_lo or less, sets the starting threshold value V_f_on to the low-pressure threshold value V_f_lo and sets the stop threshold value V_f_off to 0 (sets the starting threshold value V_r_on to the low-pressure threshold value V_r_lo and sets the stop threshold value V_r_off to 0: step S152). The brake ECU 70, when the absolute value |G_slope| is the determination threshold value G_lo or more and the determination threshold value G_hi or less, sets the starting threshold value V_f_on to the intermediate-pressure threshold value V_f_mid and sets the stop threshold value V_f_off to the low-pressure threshold value V_f_lo (sets the starting threshold value V_r_on to the intermediate-pressure threshold value V_r_mid and sets the stop threshold value V_r_off to the low-pressure threshold value V_r_lo: step S154). The brake ECU 70, when the absolute value |G_slope| is the determination threshold value G_hi or more, sets the starting threshold value V_f_on to the high-pressure threshold value V_f_hi and sets the stop threshold value V_f_off to the intermediate-pressure threshold value V_f_mid (sets the starting threshold value V_r_on to the high-pressure threshold value V_r_hi and sets the stop threshold value V_r_off to the intermediate-pressure threshold value V_r_mid: step S156).

According to this, the brake ECU 70, when brake pressurization control is DAC control, sets at least a starting threshold value to a higher value when the inclination of the slope road on which the vehicle travels is high, in comparison with when the inclination of the slope road on which the vehicle travels is low (threshold value changing unit: steps S202, 204, and 152 to 156).

In comparison with a case the inclination G_slope of the slope road on which the vehicle travels in DAC control is low, the M/C pressure increases when the inclination G_slope is high. However, according to the second embodiment, when the inclination G_slope is high (i.e., when the M/C pressure is high), since the starting threshold value is set to a higher value, the operation of the motor 60 can be suppressed, and an increase in temperature of the motor 60 is suppressed to make it possible to perform brake pressurization control for a long period.

(Third Embodiment)

A third embodiment of the present invention will be described below. The embodiment is obtained such that, in comparison with the first embodiment, the brake ECU 70, as operation suppressing control, when the brake pressurization control is TRC control, suppresses the motor 60 from being operated when slips of the wheels are stopped and when the maximum W/C pressure obtained by a control request from the brake pressurization control decreases. Since the other configuration of the third embodiment is the same as that of the first embodiment, only different parts between the first embodiment and the third embodiment will be described below.

More specifically, the brake ECU 70 executes step S212 as shown in FIG. 7. After NO is determined in step S158 and after the reservoir fluid volume EstReserv*(n) is corrected in step S160, the brake ECU 70 causes the program to proceed to step S212. In step S212, the brake ECU 70 determines whether all conditions that TRC control is being executed, that DAC control is not being executed, that a deviation differential value ΔDiffVw of a wheel speed deviation DiffVw(n) of each of all the four wheels is 0 or less, and that the upstream target pressure variable amount ΔTargetMaxPress(n) is 0 or less are established for a predetermined time.

The wheel speed deviation DiffVw(n), as shown in Equation 5, expresses a slip amount by which the vehicle body speed is larger than a control intervention threshold value. A deviation derivative value ΔDiffVw(n) is a change rate of the slip amount and is expressed by Equation 6.

$$\Delta \text{Diff}Vw^{}(n) = Vw^{} - V0 - \text{Target}VwTRC \qquad \text{(Equation 5)}$$

$$\Delta \text{Diff}Vw^{}(n) = (\text{Diff}Vw^{}(n) - \text{Diff}Vw^{**}(n-1))/\Delta T \qquad \text{(Equation 6)}$$

Vw** denotes each-wheel speed, V0 denotes a vehicle body speed, and TragetVwTRC denotes a control intervention threshold value of TRC control.

DiffVw(n) denotes a wheel speed deviation calculated in a current arithmetic operation cycle, DiffVw(n−1) denotes a wheel speed deviation calculated in a previous arithmetic operation cycle, and ΔT denotes a control cycle.

The brake ECU 70, when NO is determined in step S212, causes the program to proceed to step S162 and causes the program to proceed step S168 when YES is determined in step S212 to stop the operation of the motor 60. In step S168, the rotating speed of the motor 60 may be reduced.

An engine output is reduced first in TRC control to suppress a drive wheel from rotating. At this time, when engine torque is left, brake pressurization control is positively performed. However, when the engine torque becomes small, a slip stops without performing the brake pressurization control. In this state, a possibility that the brake is pressurized again to suppress an acceleration slip is low, and the brake pressurization control is expected to suddenly end. In contrast to this, according to the third embodiment, the brake control device 70, as operation suppressing control, when the brake pressurization control is TRC control, suppresses the motor 60 from being operated when slips of the wheels are stopped and when the maximum W/C pressure obtained by a control request from the brake pressurization control decreases.

According to this, the operation time of the motor 60 in TRC control can be further reduced, and the temperature of the motor 60 is further suppressed from increasing to make it possible to perform the brake pressurization control for a longer time.

Upon completion of the brake pressurization control, when pressurization from the upstream side is eliminated, a check valve (not shown) disposed in parallel with the pressure-reducing valve 42 (22) is opened, and the brake fluid in the reservoir 40 (20) is discharged to the M/C 13 side through the check valve.

(Fourth Embodiment)

A fourth embodiment of the present invention will be described below. The embodiment is obtained such that, in comparison with the first embodiment, the brake ECU 70, as operation suppressing control, operates the motor 60 such that total discharge rates of the pumps 19 and 39 per predetermined unit time in an operation of the motor 60 when the upstream fluid pressure (M/C pressure) is high is smaller than that obtained when the upstream fluid pressure is low. Since the other configuration of the fourth embodiment is the same as that of the first embodiment, only different parts between the first embodiment and the fourth embodiment will be described below.

More specifically, the brake ECU 70 additionally executes steps S222 to S232 as shown in FIG. 8.

The brake ECU 70, in step S222, calculates a change rate ΔEstReserv* of the reservoir fluid volume (ΔEstReserv*=EstReserv*(n)−EstReserv*(n−1)). The brake ECU 70, when the M/C pressure P_me is the determination threshold value P_lo or less, sets the rotating speed of the motor 60 to a high rotating speed Hi in step S224. The brake ECU 70, when the M/C pressure P_mc is larger than the determination threshold value P_lo and equal to or smaller than determination threshold value P_hi, sets the rotating speed of the motor 60 to an intermediate rotating speed Mid in step S226. The brake ECU 70, when the M/C pressure P_mc is larger than the determination threshold value P_hi and when the change rate ΔEstReserv* of the reservoir fluid volume decreases, sets the rotating speed of the motor 60 to a low rotating speed Lo in step S230. The brake ECU 70, when the M/C pressure P_mc is larger than the determination threshold value P_hi and when the change rate ΔEstReserv* of the reservoir fluid volume increases, sets the rotating speed of the motor 60 to the high rotating speed Hi but the low rotating speed Lo in step S232.

Although the rotating speed of the motor 60 is changed, the rotating speed may be made constant to change an ON/OFF time. More specifically, the total discharge rates of the pumps 19 and 39 per predetermined unit time in the operation of the motor 60 need only be changed.

In this manner, in the fourth embodiment, the brake control device 70, as operation suppressing control, operates the motor 60 such that total discharge rates of the pumps 19 and 39 per predetermined unit time in the operation of the motor 60 is smaller when the M/C pressure is high than when the M/C pressure is lower than that obtained when the M/C pressure is low.

According to this, the loads on the pumps 19 and 39 can be more properly reduced, the temperature of the motor 60 is suppressed from increasing to make it possible to perform brake pressurization control for a longer time.

The brake control device 70, as operation suppressing control, in an operation of the motor 60, operates the motor 60 such that the total discharge rates of the pumps 19 and 39 per predetermined unit time when variations of reservoir fluid volumes serving as amounts of brake fluid accumulated in the reservoirs 20 and 40 decrease is smaller than that obtained when the change rate increases.

For example, as shown in FIG. 9, when the M/C pressure is high (higher than P_hi), an amount of flow-in brake fluid is larger than an amount of drawn brake fluid. When a decrease in reservoir fluid volume is changed into an increase in reservoir fluid volume, the motor 60 is kept on, but the rotating speed of the motor 60 is changed from LO to Hi.

According to this, the loads on the pumps 19 and 39 can be more properly reduced depending on variations of the reservoir fluid volumes in an operation of the motor 60 (in particular, more efficiently when the M/C pressure is high), the temperature of the motor 60 is suppressed from increasing to make it possible to perform brake pressurization control for a longer time.

The invention claimed is:

1. A vehicle braking control device comprising:
a master cylinder which generates a master cylinder pressure based on an operation of a brake operation member;
wheel cylinders which are coupled to the master cylinder and generate wheel cylinder pressures to generate braking force to the wheels;
a fluid pressure adjusting unit which is disposed between the master cylinder and the wheel cylinders and adjusts the wheel cylinder pressures;
an auxiliary pressure source which acts on the master cylinder or takes in a pressure from a pressure source to make it possible to generate an upstream fluid pressure serving as a brake pressure input from the master cylinder side of the pressure adjusting unit regardless of the operation of the brake operation member; and
a control unit which uses the auxiliary pressure source and the fluid pressure adjusting unit to generate the upstream fluid pressure higher than a pressure based on an operation of the brake operation member by the auxiliary pressure source and executes brake pressurization control causing the fluid pressure adjusting unit to generate braking force for the wheels, wherein
the fluid pressure adjusting unit includes a pressure-increasing control valve which is disposed in a main pipe line connecting the master cylinder and the wheel cylinder to each other and controls communication/blocking of the main pipe line, a reservoir which discharges a brake fluid from the main pipe line through a pressure-reducing pipe line connected between the pressure-increasing control valve and the wheel cylinders in the main pipe line, a pressure-reducing control valve controlling communication/blocking of the pressure-reducing pipe line, a pump returning the brake fluid discharged to the reservoir to the main pipe line through a reflux pipe line connecting the master cylinder and the pressure-increasing control valve and a motor driving the pump, and the control unit performs operation suppressing control for suppressing an operation of the motor when the upstream fluid pressure exceeds a pressure threshold value in execution of the brake pressurization control.

2. The vehicle braking control device according to claim 1, wherein
the control unit has a reservoir capacity determination unit which determines whether a reservoir fluid volume serving as an amount of brake fluid accumulated in the reservoir exceeds a predetermined starting threshold value and becomes a predetermined stop threshold value, and a threshold value changing unit which sets, when the upstream fluid pressure exceeds the pressure threshold value, at least the starting threshold value to a value higher than that obtained when the upstream fluid pressure is low, and as operation suppressing control, operates the motor when the reservoir fluid volume exceeds the starting threshold value to draw the brake fluids from the reservoir and stops the motor when the reservoir fluid volume becomes the stop threshold value.

3. The vehicle braking control device according to claim 2, wherein the threshold value changing unit, when brake pressurization control is DAC control, sets at least a starting threshold value to a higher value when an inclination of a slope road on which a vehicle travels is high, in comparison with when the inclination of the slope road on which the vehicle travels is low.

4. The vehicle braking control device according to claim 3, wherein, when the upstream fluid pressure exceeds the pressure threshold value, the threshold value changing unit sets the stop threshold value to a value higher than that obtained when the upstream fluid pressure is low according to the starting threshold value.

5. The vehicle braking control device according to claim 4, wherein the control unit, as the operation suppressing control, in an operation of the motor, operates the motor such that, when the upstream fluid pressure exceeds the pressure threshold value, the total discharge rate of the pump per predetermined unit time is smaller than that obtained when the upstream fluid pressure is low.

6. The vehicle braking control device according to claim 5, wherein the control unit, as the operation suppressing control, in an operation of the motor, operates the motor such that the total discharge rate of the pump per predetermined unit time, when a variation of a reservoir fluid volume serving as an amount of brake fluid accumulated in the reservoir decreases, is smaller than that obtained when the change rate increases.

7. The vehicle braking control device according to claim 3, wherein the control unit, as the operation suppressing control, in an operation of the motor, operates the motor such that, when the upstream fluid pressure exceeds the pressure threshold value, the total discharge rate of the pump per predetermined unit time is smaller than that obtained when the upstream fluid pressure is low.

8. The vehicle braking control device according to claim 7, wherein the control unit, as the operation suppressing control, in an operation of the motor, operates the motor such that the total discharge rate of the pump per predetermined unit time, when a variation of a reservoir fluid volume serving as an amount of brake fluid accumulated in the reservoir decreases, is smaller than that obtained when the change rate increases.

9. The vehicle braking control device according to claim 2, wherein, when the upstream fluid pressure exceeds the pressure threshold value, the threshold value changing unit sets the stop threshold value to a value higher than that obtained when the upstream fluid pressure is low according to the starting threshold value.

10. The vehicle braking control device according to claim 9, wherein the control unit, as the operation suppressing control, in an operation of the motor, operates the motor such that, when the upstream fluid pressure exceeds the pressure threshold value, the total discharge rate of the pump per predetermined unit time is smaller than that obtained when the upstream fluid pressure is low.

11. The vehicle braking control device according to claim 10, wherein the control unit, as the operation suppressing control, in an operation of the motor, operates the motor such that the total discharge rate of the pump per predetermined unit time, when a variation of a reservoir fluid volume serving as an amount of brake fluid accumulated in the reservoir decreases, is smaller than that obtained when the change rate increases.

12. The vehicle braking control device according to claim 2, wherein the control unit, as the operation suppressing control, in an operation of the motor, operates the motor such that, when the upstream fluid pressure exceeds the pressure threshold value, the total discharge rate of the pump per predetermined unit time is smaller than that obtained when the upstream fluid pressure is low.

13. The vehicle braking control device according to claim 12, wherein the control unit, as the operation suppressing control, in an operation of the motor, operates the motor such that the total discharge rate of the pump per predetermined unit time, when a variation of a reservoir fluid volume serving as an amount of brake fluid accumulated in the reservoir decreases, is smaller than that obtained when the change rate increases.

14. The vehicle braking control device according to claim 2, wherein the control unit, as the operation suppressing control, when the brake pressurization control is TRC control, suppresses the motor from being operated when slips of the wheels are stopped and when the maximum wheel cylinder pressure obtained by a control request from the brake pressurization control decreases.

15. The vehicle braking control device according to claim 1, wherein the control unit, as the operation suppressing control, in an operation of the motor, operates the motor such that, when the upstream fluid pressure exceeds the pressure threshold value, the total discharge rate of the pump per predetermined unit time is smaller than that obtained when the upstream fluid pressure is low.

16. The vehicle braking control device according to claim 15, wherein the control unit, as the operation suppressing control, in an operation of the motor, operates the motor such that the total discharge rate of the pump per predetermined unit time, when a variation of a reservoir fluid volume serving as an amount of brake fluid accumulated in the reservoir decreases, is smaller than that obtained when the change rate increases.

17. The vehicle braking control device according to claim 1, wherein the control unit, as the operation suppressing control, when the brake pressurization control is TRC control, suppresses the motor from being operated when slips of the wheels are stopped and when the maximum wheel cylinder pressure obtained by a control request from the brake pressurization control decreases.

* * * * *